US007998888B2

(12) United States Patent
Shi et al.

(10) Patent No.: US 7,998,888 B2
(45) Date of Patent: Aug. 16, 2011

(54) THERMOPLASTIC STARCH FOR USE IN MELT-EXTRUDED SUBSTRATES (75) Inventors: Bo Shi, Neenah, WI (US); James H. Wang, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 319 days.

(21) Appl. No.: 12/057,541

(22) Filed: Mar. 28, 2008

(65) Prior Publication Data
US 2009/0247036 A1    Oct. 1, 2009

(51) Int. Cl.
C08L 3/00       (2006.01)
C08L 89/00      (2006.01)
B32B 27/12      (2006.01)

(52) U.S. Cl. ........ 442/394; 442/381; 442/414; 428/532; 524/47; 524/394

(58) Field of Classification Search ............... 442/414, 442/381, 394; 428/532; 524/47, 394
See application file for complete search history.

(56) References Cited

U.S. PATENT DOCUMENTS

| 3,137,592 | A | 6/1964 | Protzman et al. |
| 3,655,129 | A | 4/1972 | Seiner |
| 3,963,656 | A | 6/1976 | Meisert et al. |
| 4,174,330 | A | 11/1979 | Gilbert et al. |
| 4,209,417 | A | 6/1980 | Whyte |
| 4,797,468 | A | 1/1989 | De Vries |
| 5,028,648 | A | 7/1991 | Famili et al. |
| 5,028,658 | A | 7/1991 | David et al. |
| 5,093,422 | A | 3/1992 | Himes |
| 5,102,465 | A | 4/1992 | Lamond |
| 5,169,706 | A | 12/1992 | Collier, IV et al. |
| 5,292,783 | A | 3/1994 | Buchanan et al. |
| 5,382,611 | A | 1/1995 | Stepto et al. |
| 5,397,834 | A | 3/1995 | Jane et al. |
| 5,446,079 | A | 8/1995 | Buchanan et al. |
| 5,470,944 | A | 11/1995 | Bonsignore |
| 5,523,293 | A | 6/1996 | Jane et al. |
| 5,559,171 | A | 9/1996 | Buchanan et al. |
| 5,580,911 | A | 12/1996 | Buchanan et al. |
| 5,599,858 | A | 2/1997 | Buchanan et al. |
| 5,605,961 | A | 2/1997 | Lee et al. |
| 5,641,562 | A | 6/1997 | Larson et al. |
| 5,665,152 | A | 9/1997 | Bassi et al. |
| 5,747,648 | A | 5/1998 | Bassi et al. |
| 5,770,682 | A | 6/1998 | Ohara et al. |
| 5,817,721 | A | 10/1998 | Warzelhan et al. |
| 5,821,327 | A | 10/1998 | Oota et al. |
| 5,880,254 | A | 3/1999 | Ohara et al. |
| 5,900,322 | A | 5/1999 | Buchanan et al. |
| 5,910,545 | A | 6/1999 | Tsai et al. |
| 5,922,379 | A | 7/1999 | Wang |
| 5,939,192 | A | 8/1999 | Rettenbacher et al. |
| 5,945,480 | A | 8/1999 | Wang et al. |
| 5,965,708 | A | 10/1999 | Bassi et al. |
| 5,977,312 | A | 11/1999 | Bassi et al. |
| 5,981,012 | A | 11/1999 | Pomplun et al. |
| 5,985,396 | A | 11/1999 | Kerins et al. |
| 6,008,276 | A | 12/1999 | Kalbe et al. |
| 6,020,425 | A | 2/2000 | Wang et al. |
| 6,063,866 | A | 5/2000 | Wang et al. |
| 6,075,118 | A | 6/2000 | Wang et al. |
| 6,096,809 | A | 8/2000 | Lorcks et al. |
| 6,135,987 | A | 10/2000 | Tsai et al. |
| 6,225,388 | B1 | 5/2001 | Tsai et al. |
| 6,231,970 | B1 | 5/2001 | Andersen et al. |
| 6,235,816 | B1 * | 5/2001 | Lorcks et al. ............... 524/47 |
| 6,258,924 | B1 | 7/2001 | Warzelhan et al. |
| 6,296,914 | B1 | 10/2001 | Kerins et al. |
| 6,297,347 | B1 | 10/2001 | Warzelhan et al. |
| 6,326,458 | B1 | 12/2001 | Gruber et al. |
| 6,350,518 | B1 | 2/2002 | Schertz et al. |
| 6,369,215 | B1 | 4/2002 | Peltonen et al. |
| 6,414,108 | B1 | 7/2002 | Warzelhan et al. |
| 6,417,312 | B1 | 7/2002 | Kirchmeyer et al. |
| 6,469,099 | B1 | 10/2002 | Farah et al. |
| 6,517,625 | B2 | 2/2003 | Bassi et al. |
| 6,530,910 | B1 | 3/2003 | Pomplun et al. |
| 6,544,455 | B1 | 4/2003 | Tsai et al. |
| 6,552,124 | B2 | 4/2003 | Wang et al. |
| 6,552,162 | B1 | 4/2003 | Wang et al. |
| 6,565,640 | B1 | 5/2003 | Bengs et al. |
| 6,605,367 | B2 | 8/2003 | Bassi et al. |

(Continued)

FOREIGN PATENT DOCUMENTS

| EP | 0565386 A1 | 10/1993 |
| EP | 1235879 B1 | 5/2004 |
| EP | 1075188 B1 | 11/2005 |
| WO | WO 0136535 A1 | 5/2001 |
| WO | WO 02053376 A2 | 7/2002 |

(Continued)

OTHER PUBLICATIONS

U.S. Appl. No. 12/373,976, filed Jan. 15, 2009, Kaurfman et al., Highly Breathable Biodegradable Films.
U.S. Appl. No. 11/956,419, filed Dec. 14, 2007, Shi et al., Film Formed from a Blend of Biodegradable Aliphatic-Aromatic Copolyesters.
U.S. Appl. No. 12/120,260, filed May 14, 2008, Shi et al., Water-Sensitive Film Containing Thermoplastic Polyurethane.
U.S. Appl. No. 12/120,263, filed May 14, 2008, Shi et al., Water-Sensitive Film Containing an Olefinic Elastomer.
U.S. Appl. No. 12/164,487, filed Jun. 30, 2008, Wang et al., Biodegradable Packaging Film.

(Continued)

Primary Examiner — Norca L Torres-Velazquez
(74) Attorney, Agent, or Firm — Dority & Manning, P.A.

(57) ABSTRACT

A melt-extruded substrate (e.g., film, nonwoven web, etc.) that contains a thermoplastic starch formed from a starch and plasticizer is provided. The starch and plasticizer are melt blended together in the presence of a weak organic acid (e.g., lactic acid, formic acid, acetic acid, etc.). By selectively controlling certain parameters of the melt blending process (e.g., extrusion temperature, content of the components, etc.), the present inventors have discovered that the starch may be hydrolyzed in a highly efficient manner to form compositions having a comparably lower weight average molecular weight, polydispersity index, and viscosity, which are particularly suitable for use in the formation of melt-extruded substrates.

42 Claims, 4 Drawing Sheets

U.S. PATENT DOCUMENTS

| | | |
|---|---|---|
| 6,605,657 B1 | 8/2003 | Favis et al. |
| 6,660,211 B2 | 12/2003 | Topolkaraev et al. |
| 6,676,984 B1 | 1/2004 | Sharp et al. |
| 6,703,115 B2 | 3/2004 | Hale et al. |
| 6,709,671 B2 | 3/2004 | Zerbe et al. |
| 6,713,595 B2 | 3/2004 | Chung et al. |
| 6,746,705 B2 | 6/2004 | Altieri et al. |
| 6,749,795 B2 | 6/2004 | Murphy |
| 6,767,961 B1 | 7/2004 | Wang et al. |
| 6,806,353 B2 | 10/2004 | Zhang et al. |
| 6,838,403 B2 | 1/2005 | Tsai et al. |
| 6,890,989 B2 | 5/2005 | Wang et al. |
| 6,905,759 B2 | 6/2005 | Topolkaraev et al. |
| 6,921,581 B2 | 7/2005 | Van Gelder et al. |
| 6,933,335 B1 | 8/2005 | Berger et al. |
| 6,946,506 B2 | 9/2005 | Bond et al. |
| 6,958,371 B1 | 10/2005 | Wang et al. |
| 6,984,426 B2 | 1/2006 | Miksic et al. |
| 6,987,138 B2 | 1/2006 | Tokiwa et al. |
| 7,045,650 B2 | 5/2006 | Lawrey et al. |
| 7,053,151 B2 | 5/2006 | Wang et al. |
| 7,077,994 B2 | 7/2006 | Bond et al. |
| 7,098,292 B2 | 8/2006 | Zhao et al. |
| 7,124,450 B2 | 10/2006 | Davidson |
| 7,153,354 B2 | 12/2006 | Narayan et al. |
| 7,153,569 B2 | 12/2006 | Kaufman et al. |
| 7,235,594 B2 | 6/2007 | Han et al. |
| 7,297,394 B2 | 11/2007 | Khemani et al. |
| 7,307,125 B2 | 12/2007 | Chundury et al. |
| 7,368,160 B2 | 5/2008 | Inglis |
| 7,402,618 B2 | 7/2008 | Xu |
| 7,413,731 B2 | 8/2008 | Heltovics et al. |
| 2002/0098341 A1 | 7/2002 | Schiffer et al. |
| 2002/0168518 A1* | 11/2002 | Bond et al. ............. 428/364 |
| 2003/0077395 A1 | 4/2003 | Bassi et al. |
| 2003/0099692 A1 | 5/2003 | Lydzinski et al. |
| 2003/0232933 A1 | 12/2003 | Lagneaux et al. |
| 2004/0034149 A1 | 2/2004 | Garcia |
| 2004/0108611 A1 | 6/2004 | Dennis et al. |
| 2005/0186256 A1 | 8/2005 | Dihel et al. |
| 2005/0208294 A1 | 9/2005 | Kaufman et al. |
| 2005/0244606 A1 | 11/2005 | Egawa |
| 2006/0135728 A1 | 6/2006 | Peerlings et al. |
| 2006/0149199 A1 | 7/2006 | Topolkaraev et al. |
| 2007/0031555 A1 | 2/2007 | Axelrod et al. |
| 2007/0049685 A1 | 3/2007 | Hansel et al. |
| 2007/0049719 A1 | 3/2007 | Brauer et al. |
| 2007/0129467 A1 | 6/2007 | Scheer |
| 2007/0246867 A1 | 10/2007 | Nelson et al. |
| 2007/0298237 A1 | 12/2007 | Goino et al. |
| 2008/0147034 A1 | 6/2008 | Wang et al. |
| 2009/0054548 A1 | 2/2009 | Wang et al. |

FOREIGN PATENT DOCUMENTS

| | | |
|---|---|---|
| WO | WO 02053376 A3 | 7/2002 |
| WO | WO 2005113616 A2 | 12/2005 |
| WO | WO 2005113616 A3 | 12/2005 |

OTHER PUBLICATIONS

U.S. Appl. No. 12/164,539, filed Jun. 30, 2008, Funk et al., Fragranced Water-Sensitive Film.

U.S. Appl. No. 12/164,570, filed Jun. 30, 2008, Funk et al., Fragranced Biodegradable Film.

U.S. Appl. No. 12/337,779, filed Dec. 18, 2008, Shi et al., Biodegradable and Renewable Film.

U.S. Appl. No. 12/337,788, filed Dec. 18, 2008, Wang et al., Injection Molding Material Containing Starch and Plant Protein.

ASTM D 1238-04c—*Standard Test Method for Melt Flow Rates of Thermoplastics by Extrusion Plastometer*, Current edition approved Dec. 1, 2004, Originally approved in 1965, pp. 1-14.

ASTM D 1343-56—*Standard Method of Test for Viscosity of Cellulose Derivatives by Ball-Drop Method*, Adopted 1956, pp. 486-489.

ASTM D 1505-03—*Standard Test Method for Density of Plastics by the Density-Gradient Technique*, Current edition approved Nov. 1, 2003, Originally approved in 1957, pp. 1-7.

ASTM D 1525-07—*Standard Test Method for Vicat Softening Temperature of Plastics*, Current edition approved Mar. 1, 2007, Originally approved in 1958, pp. 1-9.

ASTM D 3418-03 (D 3417-99)—*Standard Test Method for Transition Temperatures and Enthalpies of Fusion and Crystallization of Polymers by Differential Scanning Calorimetry*, Current edition approved Dec. 1, 2003, Originally approved in 1976, pp. 66-72.

ASTM D 3806-98 (Reapproved 2004)—*Standard Test Method of Small-Scale Evaluation of Fire-Retardant Paints (2-Foot Tunnel Method)*, Current edition approved Jun. 1, 2004, Originally approved in 1979, pp. 1-6.

ASTM D 5034-95—*Standard Test Method for Breaking Strength and Elongation of Textile Fabrics (Grab Test)*, Current edition approved May 15, 1995, pp. 674-681.

ASTM D 5338-92—*Standard Test Method for Determining Aerobic Biodegradation of Plastic Materials Under Controlled Composting Conditions*, Current edition approved Dec. 15, 1992, pp. 456-461.

ASTM D 638-08—*Standard Test Method for Tensile Properties of Plastics*, Current edition approved Apr. 1, 2008, Originally approved in 1941, pp. 1-16.

ASTM D 790-99—*Standard Test Methods for Flexural Properties of Unreinforced and Reinforced Plastics and Electrical Insulating Materials*, Current edition approved Nov. 10, 1999, pp. 150-158.

Article—*Aging Properties of Films of Plasticized Vital Wheat Gluten Cast from Acidic and Basic Solutions*, Olabarrieta et al., Biomacromolecules, vol. 7, No. 5, 2006, pp. 1657-1664.

Article—*Biodegradable Compositions by Reactive Processing of Aliphatic Polyester/Polysaccharide Blends*, Dubois et al., Macromol. Symp., vol. 198, 2003, pp. 233-243.

Article—*Biodegradable Soy Protein-Polyester Blends by Reactive Extrusion Process*, Graiver et al., Journal of Applied Polymer Science, vol. 92, 2004, pp. 3231-3239.

Article—*Chemical Modification of Starch*, Tomasik et al., Advances in Carbohydrate Chemistry and Biochemistry, vol. 59, 2004, pp. 175-316.

Article—*Edible Protein Films and Coatings*, Food Proteins and Their Applications edited by S. Damodaran and A. Paraf, John M. Krochta, 1997, pp. 529-539.

Article—*Effects of Extruder Die Nozzle Dimensions on Expansion and Micrographic Characterization During Extrusion of Acetylated Starch*, Ganjyal et al., Starch/Stärke, vol. 56, 2004, pp. 108-117.

Article—*Extrusion of Wheat Gluten Plasticized with Glycerol: Influence of Process Conditions on Flow Behavior, Rheological Properties and Molecular Size Distribution*, Redl et al., Cereal Chemistry, vol. 76, No. 3, 1999, pp. 361-370.

Article—*Glycol Glucosides from Starch by Continuous Twin-Screw Extruder Processing*, Carr et al., Cereal Chemistry, vol. 66, No. 3, 1989, pp. 238-243.

Article—*Heat and shear mediated polymerization of plasticized wheat gluten protein upon mixing*, Redl et al., Journal of Cereal Science 38, 2003, pp. 105-114.

Article—*Polyurethane/Polyolefin Blends: Morphology, Compatibilization and Mechanical Properties*, Wang et al., Polymers & Polymer Composites, vol. 14, No. 1, 2006, 11 pages.

Article—*Preparation of Acetylated Distarch Adipates by Extrusion*, Mail et al., Lebensmittel-Wissenschaft und-Technologie, vol. 34, No. 6, 2001, pp. 384-389.

Article—*Reactivity of Wheat Gluten Protein during Mechanical Mixing: Radical and Nucleophilic Reactions for the Addition of Molecules on Sulfur*, Auvergne et al., Biomacromolecules, vol. 9, No. 2, 2008, pp. 664-671.

Article—*Soy Protein-Based Biodegradable Plastics*, Mungara et al., Proceedings in Plastics Impact on the Environment Conference, Society of Plastic, Feb. 2003, pp. 393-397.

Article—*Starch Modification, Destruction and Hydrolysis during O-Formylation*, Divers et al., Starch/Stärke 56, 2004, pp. 389-398.

Article—*The chemical modification of a range of starches under aqueous reaction conditions*, Fang et al., Carbohydrate Polymers 55, 2004, pp. 283-289.

Article—*The History of Tomorrow's Materials: Protein-Based Biopolymers*, Ralston et al., Plastics Engineering, Feb. 2008, pp. 36-40.

Article—*The Hydroxypropylation of Starch in a Self-Wiping Twin Screw Extruder*, De Graaf et al., Advances in Polymer Technology, vol. 22, No. 1, 2003, pp. 56-68.

Article—*Thermoplastic Processing of Protein-Based Bioplastics: Chemical Engineering Aspects of Mixing, Extrusion and Hot Molding*, Pommet et al., Macromol. Symp., vol. 197, 2003, pp. 207-217.

Article—*Thermoplastic Processing of Proteins for Film Formation—A Review*, Hernandez-Izquierdo et al., Journal of Food Science, vol. 73, No. 2, 2008, pp. R30-R39.

Related U.S. Patent Applications.

Abstract of Japanese Patent No. JP2006137847 dated Jun. 1, 2006, 1 page.

Abstract of Japanese Patent No. JP2006505719 dated Feb. 16, 2006, 1 page.

Search Report and Written Opinion for PCT/IB2009/050478 dated Sep. 30, 2009, 12 pages.

\* cited by examiner

THERMOPLASTIC STARCH FOR USE IN MELT-EXTRUDED SUBSTRATES

BACKGROUND OF THE INVENTION

Thermoplastic starches, either alone or in combination with other polymers, are often used in the manufacture of articles for which water or biological degradation are considered important. The thermoplastic starch is typically formed by plasticizing a native starch with a functional plasticizer or mixture of plasticizers, such as polyfunctional alcohols (e.g., ethylene glycol, propylene glycol, or glycerol). Conventional thermoplastic starches, however, are often problematic in that they absorb moisture and age during storage, exhibit processing problems, and lack the requisite mechanical strength, ductility and toughness for many applications. Various techniques were thus developed in an attempt to improve the properties of thermoplastic starch. U.S. Pat. No. 6,933,335 to Berger, et al., for instance, describes a technique that involves extruding a mixture of a thermoplastic starch and at least one hydrophobic polymer with the addition of a hydrolysis component based on polyvinyl acetate, lower functional alcohols and/or water, and an acidic catalyst (e.g., dibutyl tin oxide). According to Berger, et al., the acidic catalyst enhances the transesterification or crosslinking of the starch, the hydrophobic polymer, and hydrolysis component. For this reason, the starch component of the blend has a molecular weight that is only minimally reduced relative to native starch.

Despite the techniques developed, it has still proven problematic to form melt-extruded substrates (e.g., nonwoven webs, films, etc.) from thermoplastic starches. Films, for example, typically require polymers of appropriate molecular weights and suitable melt viscosity for processing. It is often difficult, however, to achieve both mechanical strength and water/biological degradation from such polymers. As such, a need currently exists for a thermoplastic starch that exhibits good mechanical properties and is capable of water and/or biological degradation.

SUMMARY OF THE INVENTION

In accordance with one embodiment of the present invention, a melt-extruded substrate is disclosed that comprises a thermoplastic starch formed from about 30 wt. % to about 95 wt. % of at least one starch, from about 1 wt. % to about 35 wt. % of at least one plasticizer, and from about 1 wt. % to about 35 wt. % of at least one weak organic acid. The thermoplastic starch has a weight average molecular weight of from about 1,000,000 to about 5,000,000, polydispersity index of from about 0.5 to about 20, and apparent melt viscosity of from about 50 to about 800 Pascal-seconds, determined at a temperature of 150° C. and a shear rate of 100 sec$^{-1}$.

In accordance with another embodiment of the present invention, a method for forming a substrate is disclosed. The method comprises melt blending a composition comprising from about 30 wt. % to about 95 wt. % of at least one starch, from about 1 wt. % to about 35 wt. % of at least one plasticizer, and from about 1 wt. % to about 35 wt. % of at least one weak organic acid to form a thermoplastic starch. The thermoplastic starch has a weight average molecular weight of from about 1,000,000 to about 5,000,000, polydispersity index of from about 0.5 to about 20, and apparent melt viscosity of from about 50 to about 800 Pascal-seconds, determined at a temperature of 150° C. and a shear rate of 100 sec$^{-1}$. The thermoplastic starch is extruded onto a surface to form a substrate.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

Definitions

As used herein the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, bonded carded webs, airlaid webs, coform webs, hydraulically entangled webs, and so forth.

As used herein, the term "meltblown web" generally refers to a nonwoven web that is formed by a process in which a molten thermoplastic material is extruded through a plurality of fine, usually circular, die capillaries as molten fibers into converging high velocity gas (e.g., air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 micrometers in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, educative drawing and/or other well-known spunbonding mechanisms. The production of spunbond webs is described and illustrated, for example, in U.S. Pat. Nos. 4,340,563 to Appel, et al., 3,692,618 to Dorschner, et al., 3,802,817 to Matsuki, et al., 3,338,992 to Kinney, 3,341,394 to Kinney, 3,502,763 to Hartman, 3,502,538 to Levy, 3,542,615 to Dobo, et al., and 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 micrometers, and are often between about 5 to about 20 micrometers.

DETAILED DESCRIPTION

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a melt-extruded substrate (e.g., film, nonwoven web, etc.) that contains a thermoplastic starch formed from a starch and plasticizer. The starch and plasticizer are melt blended together in the presence of a weak organic acid (e.g., lactic acid, formic acid, acetic acid, etc.). By selectively controlling certain parameters of the melt blending process (e.g., extrusion temperature, content of the components, etc.), the present inventors have discovered that the starch may be hydrolyzed in a highly efficient manner to form compositions having a comparably lower weight average molecular weight, polydispersity index, and viscosity, which are particularly suitable for use in the formation of melt-extruded substrates. In this regard, various embodiments of the present invention will now be described in more detail.

I. Thermoplastic Starch

Starch is a natural polymer composed of amylose and amylopectin. Amylose is essentially a linear polymer having a molecular weight in the range of 100,000-500,000, whereas amylopectin is a highly branched polymer having a molecular weight of up to several million. Although starch is produced in many plants, typical sources includes seeds of cereal grains, such as corn, waxy corn, wheat, sorghum, rice, and waxy rice; tubers, such as potatoes; roots, such as tapioca (i.e., cassava and manioc), sweet potato, and arrowroot; and the pith of the sago palm. Broadly speaking, native (unmodified) and/or modified starches may be employed in the present invention. Modified starches, for instance, may be employed that have been chemically modified by typical processes known in the art (e.g., esterification, etherification, oxidation, enzymatic hydrolysis, etc.). Starch ethers and/or esters may be particularly desirable, such as hydroxyalkyl starches, carboxymethyl starches, etc. The hydroxyalkyl group of hydroxylalkyl starches may contain, for instance, 2 to 10 carbon atoms, in some embodiments from 2 to 6 carbon atoms, and in some embodiments, from 2 to 4 carbon atoms. Representative hydroxyalkyl starches such as hydroxyethyl starch, hydroxypropyl starch, hydroxybutyl starch, and derivatives thereof. Starch esters, for instance, may be prepared using a wide variety of anhydrides (e.g., acetic, propionic, butyric, and so forth), organic acids, acid chlorides, or other esterification reagents. The degree of esterification may vary as desired, such as from 1 to 3 ester groups per glucosidic unit of the starch.

Regardless of whether it is in a native or modified form, the starch may contain different percentages of amylose and amylopectin, different size starch granules and different polymeric weights for amylose and amylopectin. High amylose starches contain greater than about 50% by weight amylose and low amylose starches contain less than about 50% by weight amylose. Although not required, low amylose starches having an amylose content of from about 10% to about 40% by weight, and in some embodiments, from about 15% to about 35% by weight, are particularly suitable for use in the present invention. Examples of such low amylose starches include corn starch and potato starch, both of which have an amylose content of approximately 20% by weight. Such low amylose starches typically have a number average molecular weight ("$M_n$") ranging from about 50,000 to about 1,000,000 grams per mole, in some embodiments from about 75,000 to about 800,000 grams per mole, and in some embodiments, from about 100,000 to about 600,000 grams per mole, as well as a weight average molecular weight ("$M_w$") ranging from about 5,000,000 to about 25,000,000 grams per mole, in some embodiments from about 5,500,000 to about 15,000,000 grams per mole, and in some embodiments, from about 6,000,000 to about 12,000,000 grams per mole. The ratio of the weight average molecular weight to the number average molecular weight ("$M_w/M_n$"), i.e., the "polydispersity index", is also relatively high. For example, the polydispersity index may range from about 20 to about 100. The weight and number average molecular weights may be determined by methods known to those skilled in the art.

A plasticizer is also employed in the thermoplastic starch to help render the starch melt-processable. Starches, for instance, normally exist in the form of granules that have a coating or outer membrane that encapsulates the more water-soluble amylose and amylopectin chains within the interior of the granule. When heated, plasticizers may soften and penetrate the outer membrane and cause the inner starch chains to absorb water and swell. This swelling will, at some point, cause the outer shell to rupture and result in an irreversible destructurization of the starch granule. Once destructurized, the starch polymer chains containing amylose and amylopectin polymers, which are initially compressed within the granules, will stretch out and form a generally disordered intermingling of polymer chains. Upon resolidification, however, the chains may reorient themselves to form crystalline or amorphous solids having varying strengths depending on the orientation of the starch polymer chains. Because the starch is thus capable of melting and resolidifying at certain temperatures, it is generally considered a "thermoplastic starch."

Suitable plasticizers may include, for instance, polyhydric alcohol plasticizers, such as sugars (e.g., glucose, sucrose, fructose, raffinose, maltodextrose, galactose, xylose, maltose, lactose, mannose, and erythrose), sugar alcohols (e.g., erythritol, xylitol, malitol, mannitol, and sorbitol), polyols (e.g., ethylene glycol, glycerol, propylene glycol, dipropylene glycol, butylene glycol, and hexane triol), etc. Also suitable are hydrogen bond forming organic compounds which do not have hydroxyl group, including urea and urea derivatives; anhydrides of sugar alcohols such as sorbitan; animal proteins such as gelatin; vegetable proteins such as sunflower protein, soybean proteins, cotton seed proteins; and mixtures thereof. Other suitable plasticizers may include phthalate esters, dimethyl and diethylsuccinate and related esters, glycerol triacetate, glycerol mono and diacetates, glycerol mono, di, and tripropionates, butanoates, stearates, lactic acid esters, citric acid esters, adipic acid esters, stearic acid esters, oleic acid esters, and other acid esters. Aliphatic acids may also be used, such as copolymers of ethylene and acrylic acid, polyethylene grafted with maleic acid, polybutadiene-co-acrylic acid, polybutadiene-co-maleic acid, polypropylene-co-acrylic acid, polypropylene-co-maleic acid, and other hydrocarbon based acids. A low molecular weight plasticizer is preferred, such as less than about 20,000 g/mol, preferably less than about 5,000 g/mol and more preferably less than about 1,000 g/mol.

In the present invention, the starch is hydrolyzed into lower molecular weight carbohydrates in the presence of a weak organic acid, which acts as a chain scission catalyst by splitting primarily the α-1,4 glycosidic bonds in the starch macromolecule. Particularly suitable organic acids that may be used in the present invention include organophosphoric acids; organosulfuric acids; organoboric acids; carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, tartaric acid (e.g., dextotartaric acid, mesotartaric acid, etc.), propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; phenols, such as pyrogallol (benzene-1,2,3-triol), pyrocatechol (benzenediol), etc.; blends thereof, and so forth. Anhydrides (e.g., maleic anhydride) and salts of organic acids may also be employed. Particularly suitable organic acids for use in the present invention are those having an acid dissociation constant ($pK_a$) ranging from 0 to about 8, in some embodiments from about 1 to about 5, and in some embodiments, from about 2 to about 4, determined at 25° C., such as lactic acid ($pK_a$ of 3.85), formic acid ($pK_a$ of 3.75), and acetic acid ($pK_a$ of 4.76).

The relative amount of starch, weak organic acid, and plasticizer employed in the thermoplastic starch may vary depending on a variety of factors, such as the desired molecular weight, the type of starch, the affinity of the plasticizer for the starch, etc. Typically, however, the native starch constitutes from about 30 wt. % to about 95 wt. %, in some embodiments from about 40 wt. % to about 90 wt. %, and in some embodiments, from about 50 wt. % to about 85 wt. % of the thermoplastic starch. The weak organic acid may constitute from about 1 wt. % to about 35 wt. %, in some embodiments from about 2 wt. % to about 30 wt. %, and in some embodiments, from about 5 wt. % to about 25 wt. % of the thermoplastic starch. Likewise, the plasticizer typically constitutes from about 1 wt. % to about 35 wt. %, in some embodiments from about 2 wt. % to about 30 wt. %, and in some embodiments, from about 5 wt. % to about 25 wt. % of the thermoplastic composition. It should be understood that the weight of starch referenced herein includes any bound water that naturally occurs in the starch before mixing it with other components to form the thermoplastic starch. Starches, for instance, typically have a bound water content of about 5% to 16% by weight of the starch.

Of course, other additives may also be employed in the thermoplastic starch to facilitate its use in various types of substrates. Dispersion aids, for instance, may be employed to help create a uniform dispersion of the starch/plasticizer mixture and retard or prevent separation of the thermoplastic starch into constituent phases. Likewise, the dispersion aids may also improve the water dispersibility of the substrate. When employed, the dispersion aid(s) typically constitute from about 0.01 wt. % to about 10 wt. %, in some embodiments from about 0.1 wt. % to about 5 wt. %, and in some embodiments, from about 0.5 wt. % to about 4 wt. % of the thermoplastic starch.

Although any dispersion aid may generally be employed in the present invention, surfactants having a certain hydrophilic/lipophilic balance ("HLB") may improve the long-term stability of the composition. The HLB index is well known in the art and is a scale that measures the balance between the hydrophilic and lipophilic solution tendencies of a compound. The HLB scale ranges from 1 to approximately 50, with the lower numbers representing highly lipophilic tendencies and the higher numbers representing highly hydrophilic tendencies. In some embodiments of the present invention, the HLB value of the surfactants is from about 1 to about 20, in some embodiments from about 1 to about 15 and in some embodiments, from about 2 to about 10. If desired, two or more surfactants may be employed that have HLB values either below or above the desired value, but together have an average HLB value within the desired range.

One particularly suitable class of surfactants for use in the present invention are nonionic surfactants, which typically have a hydrophobic base (e.g., long chain alkyl group or an alkylated aryl group) and a hydrophilic chain (e.g., chain containing ethoxy and/or propoxy moieties). For instance, some suitable nonionic surfactants that may be used include, but are not limited to, ethoxylated alkylphenols, ethoxylated and propoxylated fatty alcohols, polyethylene glycol ethers of methyl glucose, polyethylene glycol ethers of sorbitol, ethylene oxide-propylene oxide block copolymers, ethoxylated esters of fatty ($C_8$-$C_{18}$) acids, condensation products of ethylene oxide with long chain amines or amides, condensation products of ethylene oxide with alcohols, fatty acid esters, monoglyceride or diglycerides of long chain alcohols, and mixtures thereof. In one particular embodiment, the nonionic surfactant may be a fatty acid ester, such as a sucrose fatty acid ester, glycerol fatty acid ester, propylene glycol fatty acid ester, sorbitan fatty acid ester, pentaerythritol fatty acid ester, sorbitol fatty acid ester, and so forth. The fatty acid used to form such esters may be saturated or unsaturated, substituted or unsubstituted, and may contain from 6 to 22 carbon atoms, in some embodiments from 8 to 18 carbon atoms, and in some embodiments, from 12 to 14 carbon atoms. In one particular embodiment, mono- and di-glycerides of fatty acids may be employed in the present invention.

II. Melt Blending

The thermoplastic starch of the present invention is formed by melt blending the components together in an extruder. The mechanical shear and heat provided by the extruder facilitates the hydrolysis of the starch and allows the components to be blended together in a highly efficient manner. Batch and/or continuous melt blending techniques may be employed in the present invention. For example, a mixer/kneader, Banbury mixer, Farrel continuous mixer, single-screw extruder, twin-screw extruder, roll mill, etc., may be utilized. One particularly suitable melt-blending device is a co-rotating, twin-screw extruder (e.g., USALAB twin-screw extruder available from Thermo Electron Corporation of Stone, England or an extruder available from Werner-Pfreiderer from Ramsey, N.J.). Such extruders may include feeding and venting ports and provide high intensity distributive and dispersive mixing. For example, a starch may be initially fed to a feeding port of the twin-screw extruder. Thereafter, a plasticizer and weak organic acid may be injected into the starch. Alternatively, the components may be simultaneously fed to the feed throat of the extruder or separately at a different point along its length.

Regardless, the materials are blended under high shear/pressure and heat to ensure sufficient mixing. For example, melt blending typically occurs at a temperature of from about 40° C. to about 160° C., in some embodiments, from about 50° C. to about 150° C., and in some embodiments, from about 60° C. to about 140° C. Likewise, the apparent shear rate during melt blending may range from about 100 seconds$^{-1}$ to about 10,000 seconds$^{-1}$, in some embodiments from about 500 seconds$^{-1}$ to about 5000 seconds$^{-1}$, and in some embodiments, from about 800 seconds$^{-1}$ to about 1200 seconds$^{-1}$. The apparent shear rate is equal to $4Q/\pi R^3$, where Q is the volumetric flow rate ("m$^3$/s") of the polymer melt and R is the radius ("m") of the capillary (e.g., extruder die) through which the melted polymer flows.

Due to the hydrolysis of the starch in the presence of the weak organic acid and plasticizer during melt blending, the weight average molecular weight, polydispersity index, and viscosity of the resulting thermoplastic starch may be substantially reduced in comparison to native starches, thereby rending it more suitable for many applications. For example, the thermoplastic starch may have a weight average molecular weight ranging from about 1,000,000 to about 5,000,000 grams per mole, in some embodiments from about 1,500,000 to about 4,000,000 grams per mole, and in some embodiments, from about 2,000,000 to about 3,500,000 grams per mole. Likewise, the thermoplastic starch may have a number average molecular weight ranging from about 50,000 to about 1,000,000 grams per mole, in some embodiments from about 75,000 to about 800,000 grams per mole, and in some embodiments, from about 100,000 to about 600,000 grams per mole. The polydispersity index may be from about 0.5 to about 20, in some embodiments from about 1 to about 15, and in some embodiments, from about 2 to about 10. The thermoplastic starch may also have an apparent melt viscosity of from about 50 to about 800 Pascal seconds (Pa·s), in some embodiments from about 100 to about 700 Pa·s, and in some embodiments, from about 200 to about 600 Pa·s, as determined at a temperature of 150° C. and a shear rate of 100 sec$^{-1}$.

The melt flow index of the thermoplastic starch may range from about 0.1 to about 30 grams per 10 minutes, in some embodiments from about 0.5 to about 10 grams per 10 minutes, and in some embodiments, from about 1 to about 5 grams per 10 minutes. The melt flow index is the weight of a polymer (in grams) that may be forced through an extrusion rheometer orifice (0.0825-inch diameter) when subjected to a load of 2160 grams in 10 minutes at a certain temperature (e.g., 170° C.), measured in accordance with ASTM Test Method D1238-E. Of course, the melt flow index of the thermoplastic starch will ultimately depend upon the selected forming process. For example, when extruded as a cast film, higher melt flow index polymers are typically desired, such as about 4 grams per 10 minutes or more, in some embodiments, from about 5 to about 12 grams per 10 minutes, and in some embodiments, from about 7 to about 9 grams per 10 minutes. Likewise, when formed as a blown film, lower melt flow index polymers are typically desired, such as less than about 12 grams per 10 minutes or less, in some embodiments from about 1 to about 7 grams per 10 minutes, and in some embodiments, from about 2 to about 5 grams per 10 minutes.

III. Melt-Extruded Substrates

The thermoplastic starch of the present invention may be incorporated into any known melt-extruded substrate, such as films, nonwoven webs (e.g., spunbond webs, meltblown webs, and so forth), etc. The substrate may contain a single layer or multiple layers and may also contain additional materials such that it is considered a composite. Regardless, in certain embodiments, the thermoplastic starch may constitute at least about 50 wt. %, in some embodiments from about 60 wt. % to about 99 wt. %, and in some embodiments, from about 75 wt. % to about 95 wt. % of the polymer content of the substrate. In other embodiments, other polymer(s) may be employed to impart certain properties to the substrate (e.g., strength, solubility, etc.). In such cases, the thermoplastic starch may constitute from about 10 wt. % to about 80 wt. %, in some embodiments from about 20 wt. % to about 70 wt. %, and in some embodiments, from about 30 to about 60 wt. % of the polymer content of the substrate, while such additional polymer(s) typically constitute from about 10 wt. % to about 80 wt. %, in some embodiments from about 20 wt. % to about 70 wt. %, and in some embodiments, from about 30 to about 60 wt. % of the polymer content of the substrate.

In one embodiment, for example, the substrate may include one or more biodegradable polyesters. The term "biodegradable" generally refers to a material that degrades from the action of naturally occurring microorganisms, such as bacteria, fungi, and algae; environmental heat; moisture; or other environmental factors, such as determined according to ASTM Test Method 5338.92. The biodegradable polyesters employed in the present invention typically have a relatively low glass transition temperature ("$T_g$") to reduce stiffness of the substrate and improve the processability of the polymers. For example, the $T_g$ may be about 25° C. or less, in some embodiments about 0° C. or less, and in some embodiments, about −10° C. or less. Likewise, the melting point of the biodegradable polyesters is also relatively low to improve the rate of biodegradation. For example, the melting point is typically from about 50° C. to about 180° C., in some embodiments from about 80° C. to about 160° C., and in some embodiments, from about 100° C. to about 140° C. The melting temperature and glass transition temperature may be determined using differential scanning calorimetry ("DSC") in accordance with ASTM D-3417 as is well known in the art. Such tests may be employed using a DSC Q100 Differential Scanning Calorimeter (outfitted with a liquid nitrogen cooling accessory) and with a THERMAL ADVANTAGE (release 4.6.6) analysis software program, which are available from T.A. Instruments Inc. of New Castle, Del.

The biodegradable polyesters may also have a number average molecular weight ("$M_n$") ranging from about 40,000 to about 120,000 grams per mole, in some embodiments from about 50,000 to about 100,000 grams per mole, and in some embodiments, from about 60,000 to about 85,000 grams per mole. Likewise, the polyesters may also have a weight average molecular weight ("$M_w$") ranging from about 70,000 to about 300,000 grams per mole, in some embodiments from about 80,000 to about 200,000 grams per mole, and in some embodiments, from about 100,000 to about 150,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 4.0, in some embodiments from about 1.2 to about 3.0, and in some embodiments, from about 1.4 to about 2.0.

Examples of suitable biodegradable polyesters include aliphatic polyesters, such as polycaprolactone, polyesteramides, modified polyethylene terephthalate, polylactic acid (PLA) and its copolymers, terpolymers based on polylactic acid, polyglycolic acid, polyalkylene carbonates (such as polyethylene carbonate), polyhydroxyalkanoates (PHA), poly-3-hydroxybutyrate (PHB), poly-3-hydroxyvalerate (PHV), poly-3-hydroxybutyrate-co-4-hydroxybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aromatic polyesters and modified aromatic polyesters; and aliphatic-aromatic copolyesters. In one particular embodiment, the biodegradable polyester is an aliphatic-aromatic copolyester (e.g., block, random, graft, etc.). The aliphatic-aromatic copolyester may be synthesized using any known technique, such as through the condensation polymerization of a polyol in conjunction with aliphatic and aromatic dicarboxylic acids or anhydrides thereof. The polyols may be substituted or unsubstituted, linear or branched, polyols selected from polyols containing 2 to about 12 carbon atoms and polyalkylene ether glycols containing 2 to 8 carbon atoms. Examples of polyols that may be used include, but are not limited to, ethylene glycol, diethylene glycol, propylene glycol, 1,2-propanediol, 1,3-propanediol, 2,2-dimethyl-1,3-propanediol, 1,2-butanediol, 1,3-butanediol, 1,4-butanediol, 1,2-pentanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclohexanedimethanol, 2,2,4,4-tetramethyl-1,3-cyclobutanediol, cyclopentanediol, triethylene glycol, and tetraethylene glycol. Preferred polyols include 1,4-butanediol; 1,3-propanediol; ethylene glycol; 1,6-hexanediol; diethylene glycol; and 1,4-cyclohexanedimethanol.

Representative aliphatic dicarboxylic acids that may be used include substituted or unsubstituted, linear or branched, non-aromatic dicarboxylic acids selected from aliphatic dicarboxylic acids containing 1 to about 10 carbon atoms, and derivatives thereof. Non-limiting examples of aliphatic dicarboxylic acids include malonic, malic, succinic, oxalic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornanedicarboxylic. Representative aromatic dicarboxylic acids that may be used include substituted and unsubstituted, linear or branched, aromatic dicarboxylic acids selected from aromatic dicarboxylic acids containing 8 or more carbon atoms, and derivatives thereof. Non-limiting examples of aromatic dicarboxylic acids include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4, 4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), etc., and mixtures thereof.

The polymerization may be catalyzed by a catalyst, such as a titanium-based catalyst (e.g., tetraisopropyltitanate, tetraisopropoxy titanium, dibutoxydiacetoacetoxy titanium, or tetrabutyltitanate). If desired, a diisocyanate chain extender may be reacted with the copolyester to increase its molecular weight. Representative diisocyanates may include toluene 2,4-diisocyanate, toluene 2,6-diisocyanate, 2,4'-diphenylmethane diisocyanate, naphthylene-1,5-diisocyanate, xylylene diisocyanate, methylene diphenyl isocyanate ("MDI"), hexamethylene diisocyanate ("HMDI"), isophorone diisocyanate and methylenebis(2-isocyanatocyclohexane). Trifunctional isocyanate compounds may also be employed that contain isocyanurate and/or biurea groups with a functionality of not less than three, or to replace the diisocyanate compounds partially by tri- or polyisocyanates. The preferred diisocyanate is hexamethylene diisocyanate. The amount of the chain extender employed is typically from about 0.3 to about 3.5 wt. %, in some embodiments, from about 0.5 to about 2.5 wt. % based on the total weight percent of the polymer.

The copolyesters may either be a linear polymer or a long-chain branched polymer. Long-chain branched polymers are generally prepared by using a low molecular weight branching agent, such as a polyol, polycarboxylic acid, hydroxy acid, and so forth. Representative low molecular weight polyols that may be employed as branching agents include glycerol, trimethylolpropane, trimethylolethane, polyethertriols, 1,2,4-butanetriol, pentaerythritol, 1,2,6-hexanetriol, sorbitol, 1,1,4,4,-tetrakis (hydroxymethyl)cyclohexane, tris(2-hydroxyethyl) isocyanurate, and dipentaerythritol. Representative higher molecular weight polyols (molecular weight of 400 to 3000) that may be used as branching agents include triols derived by condensing alkylene oxides having 2 to 3 carbons, such as ethylene oxide and propylene oxide with polyol initiators. Representative polycarboxylic acids that may be used as branching agents include hemimellitic acid, trimellitic (1,2,4-benzenetricarboxylic) acid and anhydride, trimesic (1,3,5-benzenetricarboxylic) acid, pyromellitic acid and anhydride, benzenetetracarboxylic acid, benzophenone tetracarboxylic acid, 1,1,2,2-ethane-tetracarboxylic acid, 1,1, 2-ethanetricarboxylic acid, 1,3,5-pentanetricarboxylic acid, and 1,2,3,4-cyclopentanetetracarboxylic acid. Representative hydroxy acids that may be used as branching agents include malic acid, citric acid, tartaric acid, 3-hydroxyglutamic acid, mucic acid, trihydroxyglutaric acid, 4-carboxyphthalic anhydride, hydroxyisophthalic acid, and 4-(beta-hydroxyethyl)phthalic acid. Such hydroxy acids contain a combination of 3 or more hydroxyl and carboxyl groups. Especially preferred branching agents include trimellitic acid, trimesic acid, pentaerythritol, trimethylol propane and 1,2,4-butanetriol.

The aromatic dicarboxylic acid monomer constituent may be present in the copolyester in an amount of from about 10 mole % to about 40 mole %, in some embodiments from about 15 mole % to about 35 mole %, and in some embodiments, from about 15 mole % to about 30 mole %. The aliphatic dicarboxylic acid monomer constituent may likewise be present in the copolyester in an amount of from about 15 mole % to about 45 mole %, in some embodiments from about 20 mole % to about 40 mole %, and in some embodiments, from about 25 mole % to about 35 mole %. The polyol monomer constituent may also be present in the aliphatic-aromatic copolyester in an amount of from about 30 mole % to about 65 mole %, in some embodiments from about 40 mole % to about 50 mole %, and in some embodiments, from about 45 mole % to about 55 mole %.

In one particular embodiment, for example, the aliphatic-aromatic copolyester may comprise the following structure:

wherein, m is an integer from 2 to 10, in some embodiments from 2 to 4, and in one embodiment, 4;

n is an integer from 0 to 18, in some embodiments from 2 to 4, and in one embodiment, 4;

p is an integer from 2 to 10, in some embodiments from 2 to 4, and in one embodiment, 4;

x is an integer greater than 1; and y is an integer greater than 1. One example of such a copolyester is polybutylene adipate terephthalate, which is commercially available under the designation ECOFLEX® F BX 7011 from BASF Corp. Another example of a suitable copolyester containing an aromatic terephthalic acid monomer constituent is available under the designation ENPOL™ 8060M from IRE Chemicals (South Korea). Other suitable aliphatic-aromatic copolyesters may be described in U.S. Pat. Nos. 5,292,783; 5,446,079; 5,559,171; 5,580,911; 5,599,858; 5,817,721; 5,900,322; and 6,258,924, which are incorporated herein in their entirety by reference thereto for all purposes.

If desired, the substrate may also include one or more water-soluble polymers. Such polymers may be formed from monomers such as vinyl pyrrolidone, hydroxyethyl acrylate or methacrylate (e.g., 2-hydroxyethyl methacrylate), hydroxypropyl acrylate or methacrylate, acrylic or methacrylic acid, acrylic or methacrylic esters or vinyl pyridine, acrylamide, vinyl acetate, vinyl alcohol (hydrolyzed from vinyl acetate), ethylene oxide, derivatives thereof, and so forth. Other examples of suitable monomers are described in U.S. Pat. No. 4,499,154 to James, et al., which is incorporated herein in its entirety by reference thereto for all purposes. The resulting polymers may be homopolymers or interpolymers (e.g., copolymer, terpolymer, etc.), and may be nonionic, anionic, cationic, or amphoteric. In addition, the polymer may be of one type (i.e., homogeneous), or mixtures of different polymers may be used (i.e., heterogeneous). In one particular embodiment, the water-soluble polymer contains a repeating unit having a functional hydroxyl group, such as polyvinyl alcohol ("PVOH"), copolymers of polyvinyl alcohol (e.g., ethylene vinyl alcohol copolymers, methyl methacrylate vinyl alcohol copolymers, etc.), etc. Vinyl alcohol polymers, for instance, have at least two or more vinyl alcohol units in the molecule and may be a homopolymer of vinyl alcohol, or a copolymer containing other monomer units. Vinyl alcohol homopolymers may be obtained by hydrolysis of a vinyl ester polymer, such as vinyl formate, vinyl acetate, vinyl propionate, etc. Vinyl alcohol copolymers may be obtained by hydrolysis of a copolymer of a vinyl ester with an olefin having 2 to 30 carbon atoms, such as ethylene, propylene, 1-butene, etc.; an unsaturated carboxylic acid having 3 to 30 carbon atoms, such as acrylic acid, methacrylic acid, crotonic acid, maleic acid, fumaric acid, etc., or an ester, salt, anhydride or amide thereof; an unsaturated nitrile having 3 to 30 carbon atoms, such as acrylonitrile, methacrylonitrile, etc.; a vinyl ether having 3 to 30 carbon atoms, such as methyl vinyl ether, ethyl vinyl ether, etc.; and so forth. The degree of hydrolysis may be selected to optimize solubility, etc., of the polymer. For example, the degree of hydrolysis may be from about 60 mole % to about 95 mole %, in some embodiments from about 80 mole % to about 90 mole %, and in some embodiments, from about 85 mole % to about 89 mole %. Examples of suitable partially hydrolyzed polyvinyl alcohol polymers are available under the designation CELVOL™ 203, 205, 502, 504, 508, 513, 518, 523, 530, or 540 from Celanese Corp. Other suitable partially hydrolyzed polyvinyl alcohol polymers are available under the designation ELVANOL™ 50-14, 50-26, 50-42, 51-03, 51-04, 51-05, 51-08, and 52-22 from DuPont.

In addition to the components noted above, still other additives may also be incorporated into the substrate of the present invention, such as dispersion aids, melt stabilizers, processing stabilizers, heat stabilizers, light stabilizers, antioxidants, heat aging stabilizers, whitening agents, antiblocking agents, bonding agents, lubricants, fillers, etc. Dispersion aids, such as described above, may be employed to help create a uniform dispersion of a thermoplastic starch and other polymers and retard or prevent separation into constituent phases. Likewise, the dispersion aids may also improve the water dispersibility of the substrate. When employed, the dispersion aid(s) typically constitute from about 0.01 wt. % to about 15 wt. %, in some embodiments from about 0.1 wt. % to about 10 wt. %, and in some embodiments, from about 0.5 wt. % to about 5 wt. % of the substrate.

Fillers may also be employed in the substrate of the present invention. Fillers are particulates or other forms of material that may be added to the substrate polymer extrusion blend and that will not chemically interfere with the extruded substrate, but which may be uniformly dispersed throughout the substrate. Fillers may serve a variety of purposes, including enhancing opacity and/or breathability (i.e., vapor-permeable and substantially liquid-impermeable). For instance, filled films may be made breathable by stretching, which causes the polymer to break away from the filler and create microporous passageways. Breathable microporous films are described, for example, in U.S. Pat. Nos. 5,997,981; 6,015,764; and 6,111,163 to McCormack, et al.; 5,932,497 to Morman, et al.; 6,461,457 to Taylor, et al., which are incorporated herein in their entirety by reference thereto for all purposes. Further, hindered phenols are commonly used as an antioxidant in the production of substrates. Some suitable hindered phenols include those available from Ciba Specialty Chemicals under the trade name "Irganox®", such as Irganox® 1076, 1010, or E 201. Moreover, bonding agents may also be added to the substrate to facilitate bonding of the substrate to additional materials (e.g., nonwoven webs). Examples of such bonding agents include hydrogenated hydrocarbon resins. Other suitable bonding agents are described in U.S. Pat. Nos. 4,789,699 to Kieffer et al. and 5,695,868 to McCormack, which are incorporated herein in their entirety by reference thereto for all purposes.

Various known techniques may be employed to form the melt-extruded substrate of the present invention. For example, a film may be formed by blowing, casting, flat die extruding, etc., a compounded material as is known in the art. In one particular embodiment, the film may be formed by a blown process in which a gas (e.g., air) is used to expand a bubble of the extruded polymer blend through an annular die. The bubble is then collapsed and collected in flat film form. Processes for producing blown films are described, for instance, in U.S. Pat. Nos. 3,354,506 to Ralev; 3,650,649 to Schippers; and 3,801,429 to Schrenk et al., as well as U.S. Patent Application Publication Nos. 2005/0245162 to McCormack, et al. and 2003/0068951 to Boggs, et al., all of which are incorporated herein in their entirety by reference thereto for all purposes. In yet another embodiment, however, the film is formed using a casting technique.

Figure 1:
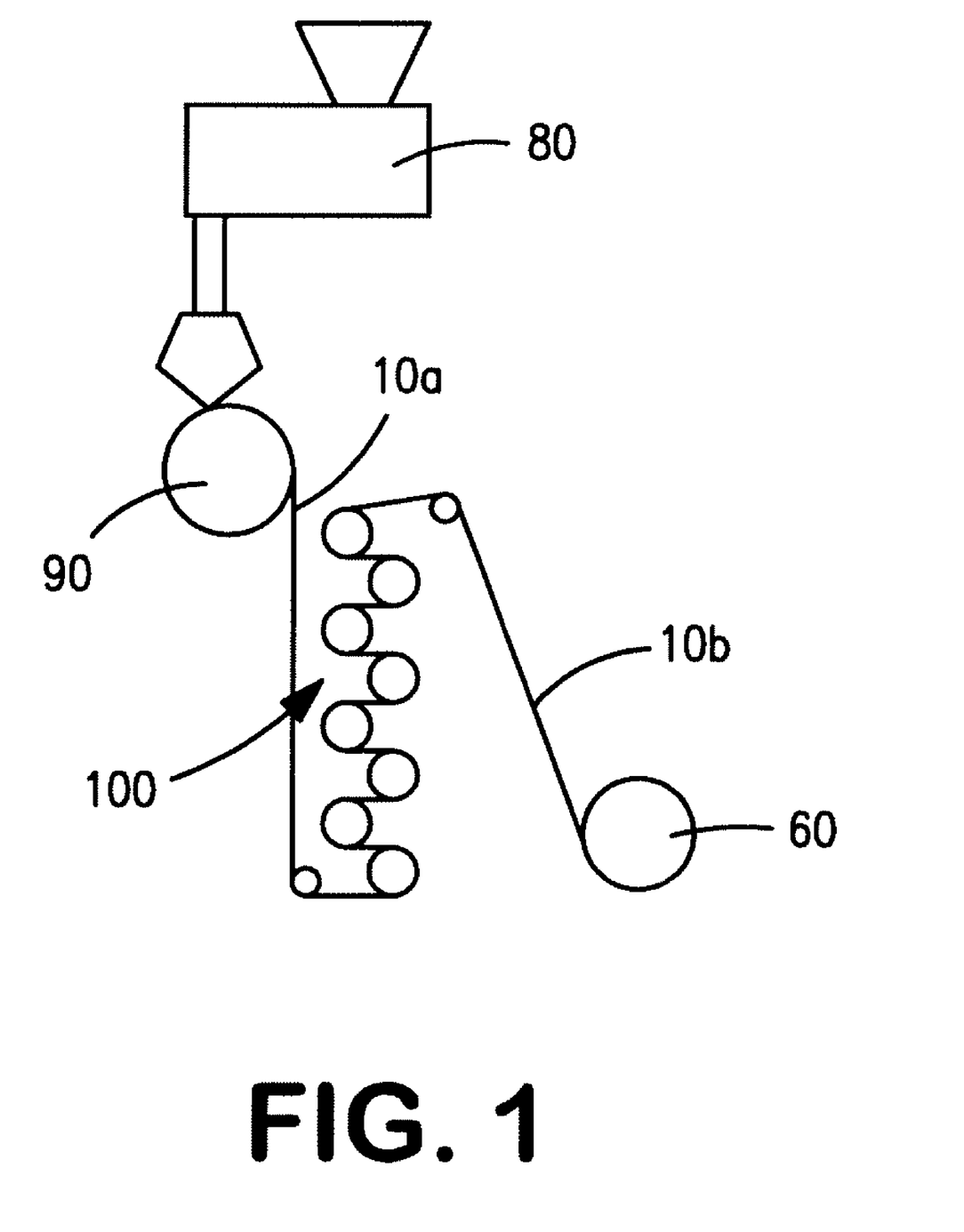
FIG. 1 is a schematic illustration of one embodiment of a method for forming a melt-extruded substrate in accordance with the present invention.

Referring to FIG. 1, for instance, one embodiment of a method for forming a cast film is shown. The raw materials may be supplied to a melt blending device, either separately or as a blend. If desired, the thermoplastic starch may be formed in the manner described above as the film is cast. Alternatively, the thermoplastic starch may be pre-formed and thereafter supplied to the melt blending device for formation of the film. In the particular embodiment of FIG. 1, the compounded material (not shown) is supplied to an extrusion apparatus 80 and cast onto a casting roll 90 to form a single-layered precursor film 10a. If a multilayered film is to be produced, the multiple layers are co-extruded together onto the casting roll 90. The casting roll 90 may optionally be provided with embossing elements to impart a pattern to the film. Typically, the casting roil 90 is kept at temperature sufficient to solidify and quench the sheet 10a as it is formed, such as from about 20 to 60° C. If desired, a vacuum box may be positioned adjacent to the casting roll 90 to help keep the precursor film 10a close to the surface of the roll 90. Additionally, air knives or electrostatic pinners may help force the precursor film 10a against the surface of the casting roll 90 as it moves around a spinning roll. An air knife is a device known in the art that focuses a stream of air at a very high flow rate to pin the edges of the film.

Once cast, the film 10a may then be optionally oriented in one or more directions to further improve film uniformity and reduce thickness. Orientation may also form micropores in a film containing a filler, thus providing breathability to the film. For example, the film may be immediately reheated to a temperature below the melting point of one or more polymers in the film, but high enough to enable the composition to be drawn or stretched. In the case of sequential orientation, the "softened" film is drawn by rolls rotating at different speeds of rotation such that the sheet is stretched to the desired draw ratio in the longitudinal direction (machine direction). This "uniaxially" oriented film may then be laminated to a fibrous web. In addition, the uniaxially oriented film may also be oriented in the cross-machine direction to form a "biaxially oriented" film. For example, the film may be clamped at its lateral edges by chain clips and conveyed into a tenter oven. In the tenter oven, the film may be reheated and drawn in the cross-machine direction to the desired draw ratio by chain clips diverged in their forward travel.

Referring again to FIG. 1, for instance, one method for forming a uniaxially oriented film is shown. As illustrated, the precursor film 10a is directed to a film-orientation unit 100 or machine direction orienter ("MDO"), such as commercially available from Marshall and Willams, Co. of Providence, R.I. The MDO has a plurality of stretching rolls (such as from 5 to 8) which progressively stretch and thin the film in the machine direction, which is the direction of travel of the film through the process as shown in FIG. 1. While the MDO 100 is illustrated with eight rolls, it should be understood that the number of rolls may be higher or lower, depending on the level of stretch that is desired and the degrees of stretching between each roll. The film may be stretched in either single or multiple discrete stretching operations. It should be noted that some of the rolls in an MDO apparatus may not be operating at progressively higher speeds. If desired, some of the rolls of the MDO 100 may act as preheat rolls. If present, these first few rolls heat the film 10a above room temperature (e.g., to 125° F.). The progressively faster speeds of adjacent rolls in the MDO act to stretch the film 10a. The rate at which the stretch rolls rotate determines the amount of stretch in the film and final film weight.

The resulting film 10b may then be wound and stored on a take-up roll 60. While not shown here, various additional potential processing and/or finishing steps known in the art, such as slitting, treating, aperturing, printing graphics, or lamination of the film with other layers (e.g., nonwoven web materials), may be performed without departing from the spirit and scope of the invention.

The thickness of the resulting melt-extruded substrate may generally vary depending upon the desired use. Nevertheless, the substrate typically has a thickness of about 150 micrometers or less, in some embodiments from about 10 to about 100 micrometers, and in some embodiments, from about 5 to about 80 micrometers. Despite having such a small thickness, the substrate is nevertheless able to retain good dry mechanical properties during use. One parameter that is indicative of the relative dry strength is the ultimate tensile strength, which is equal to the peak stress obtained in a stress-strain curve. Desirably, the substrate exhibits an ultimate tensile strength in the machine direction ("MD") of from about 5 to about 80 Megapascals (MPa), in some embodiments from about 10 to about 60 MPa, and in some embodiments, from about 15 to about 50 MPa, and an ultimate tensile strength in the cross-machine direction ("CD") of from about 1 to about 40 Megapascals (MPa), in some embodiments from about 2 to about 40 MPa, and in some embodiments, from about 5 to about 30 MPa. Although possessing good strength, it is also desirable that the substrate is not too stiff. One parameter that is indicative of the relative stiffness of the substrate (when dry) is Young's modulus of elasticity, which is equal to the ratio of the tensile stress to the tensile strain and is determined from the slope of a stress-strain curve. For example, the substrate typically exhibits a Young's modulus in the machine direction ("MD") of from about 20 to about 800 Megapascals ("MPa"), in some embodiments from about 50 to about 500 MPa, and in some embodiments, from about 100 to about 500 MPa, and a Young's modulus in the cross-machine direction ("CD") of from about 5 to about 250 Megapascals ("MPa"), in some embodiments from about 10 to about 200 MPa, and in some embodiments, from about 20 to about 150 MPa. The MD and CD elongation of the substrate may also be about 100% or more, in some embodiments about 200% or more, and in some embodiments, about 300% or more. Furthermore, the substrate may also be water-sensitive (e.g., water-soluble, water-dispersible, etc.) in that it loses integrity over time in the presence of water.

The melt-extruded substrate of the present invention may be used in a wide variety of applications. For example, as indicated above, the substrate may be used in an absorbent article. An "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins, pantiliners, etc.), swim wear, baby wipes, and so forth; medical absorbent articles, such as garments, fenestration materials, underpads, bedpads, bandages, absorbent drapes, and medical wipes; food service wipers; clothing articles; and so forth. Several examples of such absorbent articles are described in U.S. Pat. Nos. 5,649,916 to DiPalma, et al.; 6,110,158 to Kielpikowski; 6,663,611 to Blaney, et al., which are incorporated herein in their entirety by reference thereto for all purposes. Still other suitable articles are described in U.S. Patent Application Publication No. 2004/0060112 A1 to Fell et al., as well as U.S. Pat. Nos. 4,886,512 to Damico, et al.; 5,558,659 to Sherrod et al.; 6,888,044 to Fell et al. and 6,511,465 to Freiburger et al., all of which are incorporated herein in their entirety by reference thereto for all purposes. Materials and processes suitable for forming such absorbent articles are well known to those skilled in the art.

As is well known in the art, the absorbent article may be provided with adhesives (e.g., pressure-sensitive adhesives) that help removably secure the article to the crotch portion of an undergarment and/or wrap up the article for disposal. Suitable pressure-sensitive adhesives, for instance, may include acrylic adhesives, natural rubber adhesives, tackified block copolymer adhesives, polyvinyl acetate adhesives, ethylene vinyl acetate adhesives, silicone adhesives, polyurethane adhesives, thermosettable pressure-sensitive adhesives, such as epoxy acrylate or epoxy polyester pressure-sensitive adhesives, etc. Such pressure-sensitive adhesives are known in the art and are described in the Handbook of Pressure Sensitive Adhesive Technology, Satas (Donatas), 1989, $2^{nd}$ edition, Van Nostrand Reinhold. The pressure sensitive adhesives may also include additives such as cross-linking agents, fillers, gases, blowing agents, glass or polymeric microspheres, silica, calcium carbonate fibers, surfactants, and so forth. The additives are included in amounts sufficient to affect the desired properties.

The location of the adhesive on the absorbent article is not critical and may vary widely depending on the intended use of the article. For example, certain feminine hygiene products (e.g., sanitary napkins) may have wings or flaps that laterally from a central absorbent core and are intended to be folded around the edges of the wearer's panties in the crotch region. The flaps may be provided with an adhesive (e.g., pressure-sensitive adhesive) for affixing the flaps to the underside of the wearer's panties.

Regardless of the particular location of the adhesive, however, a release liner may be employed to cover the adhesive, thereby protecting it from dirt, drying out, and premature sticking prior to use. The release liner may contain a release coating that enhances the ability of the liner to be peeled from an adhesive. The release coating contains a release agent, such as a hydrophobic polymer. Exemplary hydrophobic polymers include, for instance, silicones (e.g., polysiloxanes, epoxy silicones, etc.), perfluoroethers, fluorocarbons, polyurethanes, and so forth. Examples of such release agents are described, for instance, in U.S. Pat. Nos. 6,530,910 to Pomplun, et al.; 5,985,396 to Kerins, et al.; and 5,981,012 to Pomplun, et al., which are incorporated herein in their entirety by reference thereto for all purposes. One particularly suitable release agent is an amorphous polyolefin having a melt viscosity of about 400 to about 10,000 cps at 190° C., such as made by the U.S. Rexene Company under the tradename REXTAC® (e.g., RT2315, RT2535 and RT2330). The release coating may also contain a detackifier, such as a low molecular weight, highly branched polyolefin. A particularly suitable low molecular weight, highly branched polyolefin is VYBAR® 253, which is made by the Petrolite Corporation. Other additives may also be employed in the release coating, such as compatibilizers, processing aids, plasticizers, tackifiers, slip agents, and antimicrobial agents, and so forth. The release coating may be applied to one or both surfaces of the liner, and may cover all or only a portion of a surface. Any suitable technique may be employed to apply the release coating, such as solvent-based coating, hot melt coating, solventless coating, etc. Solvent-based coatings are typically applied to the release liner by processes such as roll coating, knife coating, curtain coating, gravure coating, wound rod coating, and so forth. The solvent (e.g., water) is then removed by drying in an oven, and the coating is optionally cured in the oven. Solventless coatings may include solid compositions, such as silicones or epoxy silicones, which are coated onto the liner and then cured by exposure to ultraviolet light. Optional steps include priming the liner before coating or surface modification of the liner, such as with corona treatment. Hot melt coatings, such as polyethylenes or perfluoroethers, may be heated and then applied through a die or with a heated knife. Hot melt coatings may be applied by co-extruding the release agent with the release liner in blown film or sheet extruder for ease of coating and for process efficiency.

Figure 5:
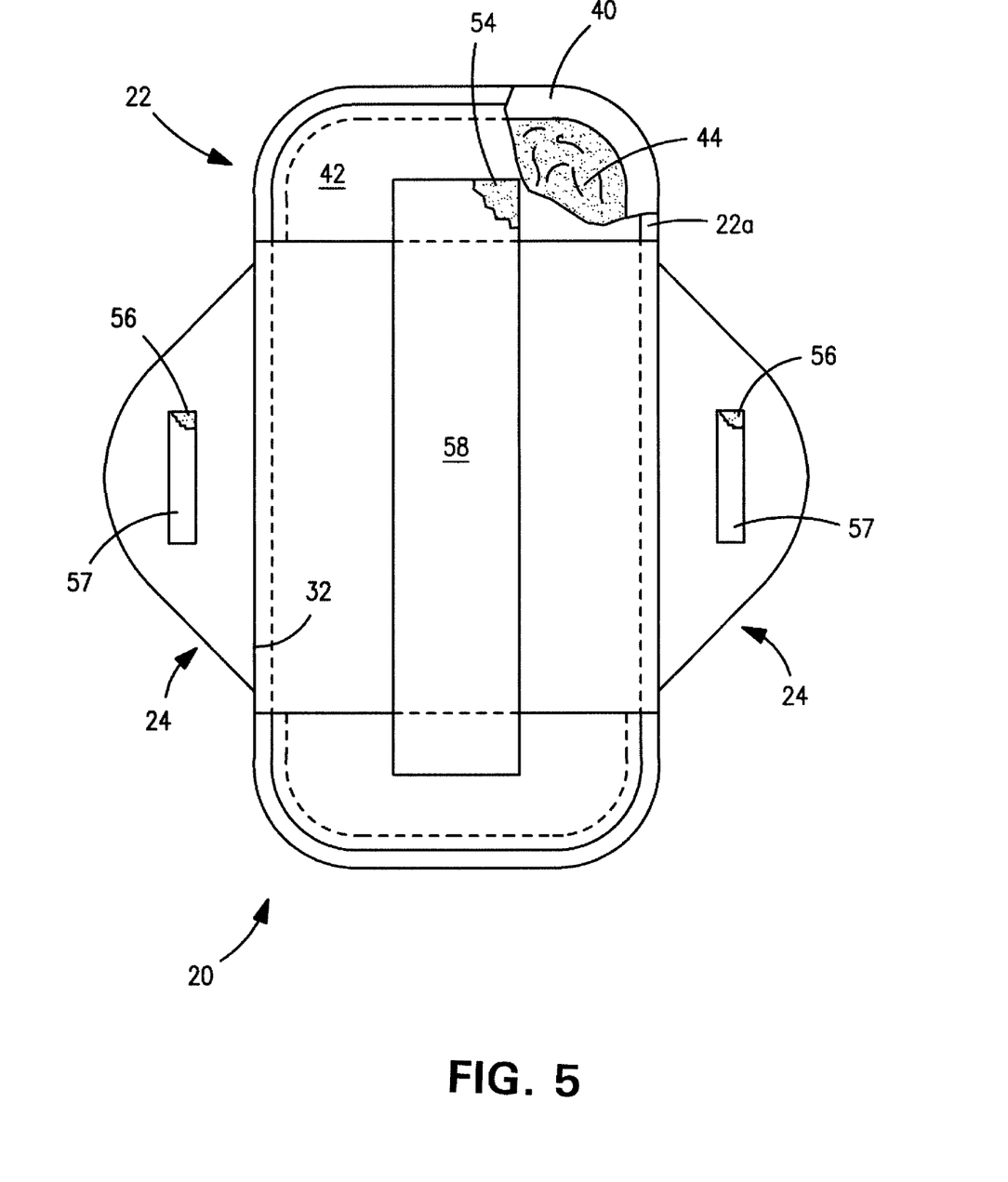
FIG. 5 is a top view of an absorbent article that may be formed in accordance with one embodiment of the present invention.

To facilitate its ability to be easily disposed, the release liner may be formed from a melt-extruded substrate (e.g., film) in accordance with the present invention. In this regard, one particular embodiment of a sanitary napkin that may employ the substrate of the present invention will now be described in more detail. For purposes of illustration only, an absorbent article 20 is shown in FIG. 5 as a sanitary napkin for feminine hygiene. In the illustrated embodiment, the absorbent article 20 includes a main body portion 22 containing a topsheet 40, an outer cover or backsheet 42, an absorbent core 44 positioned between the backsheet 42 and the topsheet 40, and a pair of flaps 24 extending from each longitudinal side 22a of the main body portion 22. The topsheet 40 defines a bodyfacing surface of the absorbent article 20. The absorbent core 44 is positioned inward from the outer periphery of the absorbent article 20 and includes a body-facing side positioned adjacent the topsheet 40 and a garment-facing surface positioned adjacent the backsheet 42.

The topsheet 40 is generally designed to contact the body of the user and is liquid-permeable. The topsheet 40 may surround the absorbent core 44 so that it completely encases the absorbent article 20. Alternatively, the topsheet 40 and the backsheet 42 may extend beyond the absorbent core 44 and be peripherally joined together, either entirely or partially, using known techniques. Typically, the topsheet 40 and the backsheet 42 are joined by adhesive bonding, ultrasonic bonding, or any other suitable joining method known in the art. The topsheet 40 is sanitary, clean in appearance, and somewhat opaque to hide bodily discharges collected in and absorbed by the absorbent core 44. The topsheet 40 further exhibits good strike-through and rewet characteristics permitting bodily discharges to rapidly penetrate through the topsheet 40 to the absorbent core 44, but not allow the body fluid to flow back through the topsheet 40 to the skin of the wearer. For example, some suitable materials that may be used for the topsheet 40 include nonwoven materials, perforated thermoplastic films, or combinations thereof. A nonwoven fabric made from polyester, polyethylene, polypropylene, bicomponent, nylon, rayon, or like fibers may be utilized. For instance, a white uniform spunbond material is particularly desirable because the color exhibits good masking properties to hide menses that has passed through it. U.S. Pat. No. 4,801,494 to Datta, et al. and U.S. Pat. No. 4,908,026 to Sukiennik, et al. teach various other cover materials that may be used in the present invention.

The topsheet 40 may also contain a plurality of apertures (not shown) formed therethrough to permit body fluid to pass more readily into the absorbent core 44. The apertures may be randomly or uniformly arranged throughout the topsheet 40, or they may be located only in the narrow longitudinal band or strip arranged along the longitudinal axis X-X of the absorbent article 20. The apertures permit rapid penetration of body fluid down into the absorbent core 44. The size, shape, diameter and number of apertures may be varied to suit one's particular needs.

As stated above, the absorbent article also includes a backsheet 42. The backsheet 42 is generally liquid-impermeable and designed to face the inner surface, i.e., the crotch portion of an undergarment (not shown). The backsheet 42 may permit a passage of air or vapor out of the absorbent article 20, while still blocking the passage of liquids. Any liquid-impermeable material may generally be utilized to form the backsheet 42. For example, one suitable material that may be utilized is a microembossed polymeric film, such as polyethylene or polypropylene. In particular embodiments, a polyethylene film is utilized that has a thickness in the range of about 0.2 mils to about 5.0 mils, and particularly between about 0.5 to about 3.0 mils.

The absorbent article 20 also contains an absorbent core 44 positioned between the topsheet 40 and the backsheet 42. The absorbent core 44 may be formed from a single absorbent member or a composite containing separate and distinct absorbent members. It should be understood, however, that any number of absorbent members may be utilized in the present invention. For example, in one embodiment, the absorbent core 44 may contain an intake member (not shown) positioned between the topsheet 40 and a transfer delay member (not shown). The intake member may be made of a material that is capable of rapidly transferring, in the z-direction, body fluid that is delivered to the topsheet 40. The intake member may generally have any shape and/or size desired. In one embodiment, the intake member has a rectangular shape, with a length equal to or less than the overall length of the absorbent article 20, and a width less than the width of the absorbent article 20. For example, a length of between about 150 mm to about 300 mm and a width of between about 10 mm to about 60 mm may be utilized.

Any of a variety of different materials may be used for the intake member to accomplish the above-mentioned functions. The material may be synthetic, cellulosic, or a combination of synthetic and cellulosic materials. For example, airlaid cellulosic tissues may be suitable for use in the intake member. The airlaid cellulosic tissue may have a basis weight ranging from about 10 grams per square meter (gsm) to about 300 gsm, and in some embodiments, between about 100 gsm to about 250 gsm. In one embodiment, the airlaid cellulosic tissue has a basis weight of about 200 gsm. The airlaid tissue may be formed from hardwood and/or softwood fibers. The airlaid tissue has a fine pore structure and provides an excellent wicking capacity, especially for menses.

If desired, a transfer delay member (not shown) may be positioned vertically below the intake member. The transfer delay member may contain a material that is less hydrophilic than the other absorbent members, and may generally be characterized as being substantially hydrophobic. For example, the transfer delay member may be a nonwoven fibrous web composed of a relatively hydrophobic material, such as polypropylene, polyethylene, polyester or the like, and also may be composed of a blend of such materials. One example of a material suitable for the transfer delay member is a spunbond web composed of polypropylene, multi-lobal fibers. Further examples of suitable transfer delay member materials include spunbond webs composed of polypropylene fibers, which may be round, tri-lobal or poly-lobal in cross-sectional shape and which may be hollow or solid in structure. Typically the webs are bonded, such as by thermal bonding, over about 3% to about 30% of the web area. Other examples of suitable materials that may be used for the transfer delay member are described in U.S. Pat. No. 4,798,603 to Meyer, et al. and U.S. Pat. No. 5,248,309 to Serbiak, et al., which are incorporated herein in their entirety by reference thereto for all purposes. To adjust the performance of the invention, the transfer delay member may also be treated with a selected amount of surfactant to increase its initial wettability.

The transfer delay member may generally have any size, such as a length of about 150 mm to about 300 mm. Typically, the length of the transfer delay member is approximately equal to the length of the absorbent article 20. The transfer delay member may also be equal in width to the intake member, but is typically wider. For example, the width of the transfer delay member may be from between about 50 mm to about 75 mm, and particularly about 48 mm. The transfer delay member typically has a basis weight less than that of the other absorbent members. For example, the basis weight of the transfer delay member is typically less than about 150 grams per square meter (gsm), and in some embodiments, between about 10 gsm to about 100 gsm. In one particular embodiment, the transfer delay member is formed from a spunbonded web having a basis weight of about 30 gsm.

Besides the above-mentioned members, the absorbent core 44 may also include a composite absorbent member (not shown), such as a coform material. In this instance, fluids may be wicked from the transfer delay member into the composite absorbent member. The composite absorbent member may be formed separately from the intake member and/or transfer delay member, or may be formed simultaneously therewith. In one embodiment, for example, the composite absorbent member may be formed on the transfer delay member or intake member, which acts a carrier during the coform process described above.

Regardless of its particular construction, the absorbent article 20 typically contains an adhesive for securing to an undergarment. An adhesive may be provided at any location of the absorbent article 20, such as on the lower surface of the backsheet 42. In this particular embodiment, the backsheet 42 carries a longitudinally central strip of garment adhesive 54 covered before use by a peelable release liner 58, which may be formed in accordance with the present invention. Each of the flaps 24 may also contain an adhesive 56 positioned adjacent to the distal edge 34 of the flap 24. A peelable release liner 57, which may also be formed in accordance with the present invention, may cover the adhesive 56 before use. Thus, when a user of the sanitary absorbent article 20 wishes to expose the adhesives 54 and 56 and secure the absorbent article 20 to the underside of an undergarment, the user simply peels away the liners 57 and 58 and disposed them in a water-based disposal system (e.g., in a toilet).

Although various configurations of a release liner have been described above, it should be understood that other release liner configurations are also included within the scope of the present invention. Further, the present invention is by no means limited to release liners and the melt-extruded substrate may be incorporated into a variety of different components of an absorbent article. For example, referring again to FIG. 5, the backsheet 42 of the napkin 20 may include the melt-extruded substrate (e.g., film) of the present invention. In such embodiments, the substrate may be used alone to form the backsheet 42 or laminated to one or more additional materials, such as a nonwoven web. The melt-extruded substrate of the present invention may also be used in applications other than absorbent articles. For example, the substrate may be employed as an individual wrap, packaging pouch, or bag for the disposal of a variety of articles, such as food products, absorbent articles, etc. Various suitable pouch, wrap, or bag configurations for absorbent articles are disclosed, for instance, in U.S. Pat. Nos. 6,716,203 to Sorebo, et al. and 6,380,445 to Moder, et al., as well as U.S. Patent Application Publication No. 2003/0116462 to Sorebo, et al., all of which are incorporated herein in their entirety by reference thereto for all purposes.

The present invention may be better understood with reference to the following examples.

Test Methods

Apparent Melt Viscosity:

The rheological properties of polymer samples were determined using a Göttfert Rheograph 2003 capillary rheometer with WinRHEO version 2.31 analysis software. The setup included a 2000-bar pressure transducer and a 30/1:0/180 roundhole capillary die. Sample loading was done by alternating between sample addition and packing with a ramrod. A 2-minute melt time preceded each test to allow the polymer to completely melt at a test temperature (150° C. or 160° C.). The capillary rheometer determined the apparent melt viscosity (Pa·s) at various shear rates, such as 100, 200, 500, 1000, 2000, and 4000 s$^{-1}$. The resultant rheology curve of apparent shear rate versus apparent melt viscosity gave an indication of how the polymer would run at that temperature in an extrusion process.

Tensile Properties:

The strip tensile strength values were determined in substantial accordance with ASTM Standard D-5034. A constant-rate-of-extension type of tensile tester was employed. The tensile testing system was a Sintech 1/D tensile tester, which is available from Sintech Corp. of Cary, N.C. The tensile tester was equipped with TESTWORKS 4.08B software from MTS Corporation to support the testing. An appropriate load cell was selected so that the tested value fell within the range of 10-90% of the full scale load. The film samples were initially cut into dog-bone shapes with a center width of 3.0 mm before testing. The samples were held between grips having a front and back face measuring 25.4 millimeters×76 millimeters. The grip faces were rubberized, and the longer dimension of the grip was perpendicular to the direction of pull. The grip pressure was pneumatically maintained at a pressure of 40 pounds per square inch. The tensile test was run using a gauge length of 18.0 millimeters and a break sensitivity of 40%. Five samples were tested by applying the test load along the machine-direction and five samples were tested by applying the test load along the cross direction. During the test, samples were stretched at a crosshead speed of abut 127 millimeters per minute until breakage occurred. The modulus, peak stress, and elongation were measured in the machine direction ("MD") and cross-machine directions ("CD").

Water Disintegration Test:

The rate of film disintegration in tap water was tested using a "slosh box", which has a physical dimension of a 14"×18"× 12" high plastic box on a hinged platform. One end of the platform is attached to the reciprocating cam. The typical amplitude is ±2" (4" range), with sloshing occurring at 0.5-1.5 sloshes per second. The preferred action is 0.9~1.3 sloshes per second. During a test, the slosh box rocks up and down with the water inside, "sloshing" back and forth. This action produces a wave front and intermittent motion on a sample susceptible to dispersing in water. To quantify a measurement of sample film disintegration in water, without image analysis, simply timing is sufficient. Three liters of tap water were added into the slosh box and resulted in ~5.5" water depth in the box. A frequency of 3.5 was selected for the testing. Each film sample was cut into 1"×3" size. Three pieces were dropped into the slosh box. The time to disintegrate the sample under the defined conditions was recorded twice for each sample. The average of the time to the sample disintegration is then reported. Generally, films reach an acceptable dispersion point when no piece is larger than 25 mm$^2$ in size within 6 hours of agitation.

Example 1

A thermoplastic starch containing a native starch and a plasticizer was formed as follows. Initially, 2% Excel P-40S (mono-di-glyceride, Kao Corp. of Japan) was dry mixed with native corn starch (Cargill, Inc., Minneapolis, Minn.) in a kitchen mixer and then added to a K-Tron gravimetric feeder (Model KCL-QX4, K-Tron North America, Pitman, N.Y.) that fed the material into a Thermo Prism™ USALAB 16 twin screw extruder (Thermo Electron Corp., Stone, England). The extruder had 11 zones, numbered consecutively 0-10 from the feed hopper to the die. The temperature profile of zones 1 to 10 of the extruder was 70° C., 80° C., 100° C., 140° C., 140° C., 140° C., 120° C., 100° C., 80° C., and 60° C., respectively. The screw speed was set at 170 rpm to achieve a torque of between 60-75% during the processing. The starch feeding rate was fixed at 15 grams per minute at 20 rpm with an agitator. The starch was fed to the feed throat of the extruder (un-heated, before zone 1 of the extruder). Glycerol (98% purity, Cognis Corporation, Cincinnati, Ohio) was injected into zone 1 of the extruder using a plasticizer gear pump (Bodine Electric Company, Grand Island, N.Y.). The liquid pump rate was manually fixed at 4 grams per minute at 30 rpm and 5.8 grams per minute at 40 rpm. In some cases, a vent was also opened to release steam generated. The resulting strand cooled down through a cooling belt (Minarik Electric Company, Glendale, Calif.). A pelletizer (Emerson Industrial Controls, Grand Island, N.Y.) was used to cut the strand to produce thermoplastic starch pellets containing 30 wt. % glycerol.

Example 2

A thermoplastic starch containing a native starch and a plasticizer was formed as described in Example 1, except that a mixture of 80 wt. % glycerol (98% purity, Cognis Corp.) and 20 wt. % water was used as the plasticizer.

Example 3

A thermoplastic starch was formed from a native starch, plasticizer, and weak organic acid as follows. Initially, 2% Excel P-40S was dry mixed with native corn starch (Cargill, Inc., Minneapolis, Minn.) in a kitchen mixer and then added to a K-Tron gravimetric feeder (Model KCL-QX4, K-Tron) that fed the material into a Thermo Prism™ USALAB 16 twin screw extruder. The temperature profile of zones 1 to 10 of the extruder was 70° C., 80° C., 100° C., 140° C., 140° C., 140° C., 120° C., 100° C., 80° C., and 60° C., respectively. The screw speed was set at 170 rpm to achieve a torque of between 60-75% during the processing. The starch feeding rate was fixed at 15 grams per minute at 20 rpm with an agitator. The starch was fed to the feed throat of the extruder (un-heated, before zone 1 of the extruder). A mixture of 50 wt. % glycerol and 50 wt. % lactic acid (85% in water, Sigma-Aldrich, St. Louis, Mo.) was injected into zone 1 of the extruder using a plasticizer gear pump (Bodine Electric Company, Grand Island, N.Y.). The liquid pump rate was manually fixed at 4 grams per minute at 30 rpm and 5.8 grams per minute at 40 rpm. In some cases, a vent was also opened to release steam generated. The resulting strand cooled down through a cooling belt (Minarik Electric Company, Glendale, Calif.). A pelletizer (Emerson Industrial Controls, Grand Island, N.Y.) was used to cut the strand to produce thermoplastic starch pellets containing 10 wt. % glycerol and 10 wt. % lactic acid.

Example 4

A thermoplastic starch was formed as described in Example 3, except that 100 wt. % lactic acid was injected into zone 1 of the extruder rather than a mixture of 50 wt. % glycerol and 50 wt. % lactic acid. The resulting thermoplastic modified starch contained 20 wt. % lactic acid.

Example 5

A thermoplastic starch was formed as described in Example 3, except that a mixture of 25 wt. % acetic acid (Sigma-Aldrich, St. Louis, Mo.) and 75 wt. % glycerol was injected into zone 1 of the extruder rather than a mixture of 50 wt. % glycerol and 50 wt. % lactic acid. The resulting thermoplastic modified starch contained 5 wt. % acetic acid and 15 wt. % glycerol.

Example 6

A thermoplastic starch was formed as described in Example 3, except that a mixture of 50 wt. % formic acid (Sigma-Aldrich, St. Louis, Mo.) and 50 wt. % glycerol was injected into zone 1 of the extruder rather than a mixture of 50 wt. % glycerol and 50 wt. % lactic acid. The resulting thermoplastic modified starch contained 10 wt. % formic acid and 10 wt. % glycerol.

Example 7

A thermoplastic starch containing a native starch and a plasticizer was formed as follows. Initially, 2% Excel P-40S was dry mixed with native potato starch (Penford Food Ingredients Co., Englewood, Colo.) in a kitchen mixer and then added to a K-Tron gravimetric feeder (Model KCL-QX4, K-Tron) that fed the material into a Thermo Prism™ USALAB 16 twin screw extruder. The temperature profile of zones 1 to 10 of the extruder was 90° C., 100° C., 120° C., 130° C., 120° C., 115° C., 110° C., 100° C., 90° C., and 60° C., respectively. The screw speed was set at 170 rpm to achieve a torque of between 55-65% during the processing. The starch feeding rate was fixed at 15 grams per minute at 20 rpm with an agitator. The starch was fed to the feed throat of the extruder (un-heated, before zone 1 of the extruder). A mixture of 80 wt. % glycerol and 20 wt. % water was injected into zone 1 of the extruder using a plasticizer gear pump (Bodine Electric Company, Grand Island, N.Y.). The liquid pump rate was manually fixed at 4 grams per minute at 30 rpm and 5.8 grams per minute at 40 rpm. In some cases, a vent was also opened to release steam generated. The resulting strand cooled down through a cooling belt (Minarik Electric Company, Glendale, Calif.). A pelletizer (Emerson Industrial Controls, Grand Island, N.Y.) was used to cut the strand to produce thermoplastic starch pellets containing 30 wt. % glycerol.

Example 8

A thermoplastic starch was formed from a native starch, plasticizer, and weak organic acid as follows. Initially, 2% Excel P-40S was dry mixed with native potato starch (Penford Food Ingredients Co., Englewood, Colo.) in a kitchen mixer and then added into a K-Tron gravimetric feeder (Model KCL-QX4, K-Tron) that fed the material into a Thermo Prism™ USALAB 16 twin screw extruder. The temperature profile of zones 1 to 10 of the extruder was 90° C., 100° C., 120° C., 130° C., 120° C., 115° C., 110° C., 100° C., 90° C., and 60° C., respectively. The screw speed was set at 170 rpm to achieve a torque of between 55~65% during the processing. The starch feeding rate was fixed at 15 grams per minute at 20 rpm with an agitator. The starch was fed to the feed throat of the extruder (un-heated, before zone 1 of the extruder). A mixture of 50 wt. % glycerol (98% purity, Cognis Corporation, Cincinnati, Ohio) and 50 wt. % lactic acid was injected into zone 1 of the extruder using a plasticizer gear pump (Bodine Electric Company, Grand Island, N.Y.). The liquid pump rate was manually fixed at 4 grams per minute at 30 rpm and 5.8 grams per minute at 40 rpm. In some cases, a vent was also opened to release steam generated. The resulting strand cooled down through a cooling belt (Minarik Electric Company, Glendale, Calif.). A pelletizer (Emerson Industrial Controls, Grand Island, N.Y.) was used to cut the strand to produce thermoplastic starch pellets containing 10 wt. % glycerol and 10 wt. % lactic acid.

Example 9

The molecular weight of the thermoplastic starches of Examples 1-8 was determined using conventional gel permeation chromatography in DMSO (dimethyl sulfoxide) at elevated temperature (100° C.) and with dextran as the reference standard. The resulting molecular weight distribution is set forth below in Table 1.

TABLE 1

| Molecular Weight Distribution | | | |
| --- | --- | --- | --- |
| Starch Sample | Mn | Mw | Mw/Mn |
| Native Corn Starch | 168,600 | 6,380,000 | 37.84 |
| Native Potato Starch | 441,800 | 10,200,000 | 23.09 |
| Example 3 | 497,600 | 2,964,000 | 6.77 |
| Example 8 | 486,900 | 2,767,000 | 5.68 |
| Example 6 | 286,100 | 2,158,000 | 7.54 |
| Example 5 | 446,900 | 2,888,000 | 6.46 |

As indicated, the weight average molecular weights decreased for both types of thermoplastic starches when processed with a weak organic acid and plasticizer. Quite surprisingly, however, the number average molecular weights of both the corn and potato thermoplastic starches increased after preparation.

Example 10

Figure 2:
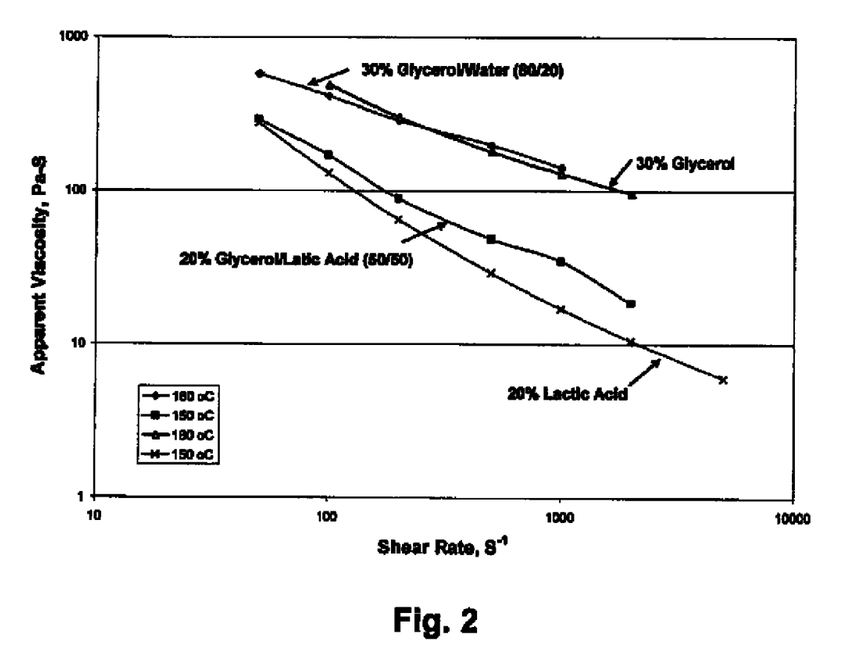
FIG. 2 is a graphical representation of the apparent melt viscosity (Pa-s) of the thermoplastic starches of Examples 1-4 versus shear rate (s$^{-1}$)

The viscosity of the thermoplastic starches of Examples 1-4 was also determined as described above. The results are set forth in FIG. 2. As indicated, the resulting viscosity values for the thermoplastic starch made using 30% glycerol/water (80/20) were identical to those made using 30% glycerol, indicating there is no change in starch molecular weight distribution. However, when lactic acid was present (Examples 3 and 4), the resulting thermoplastic starch showed a remarkable decrease in melt viscosity, indicating breakdown or hydrolysis of starch macromolecule chains due to chemical modifications during melt blending.

Example 11

Figure 3:
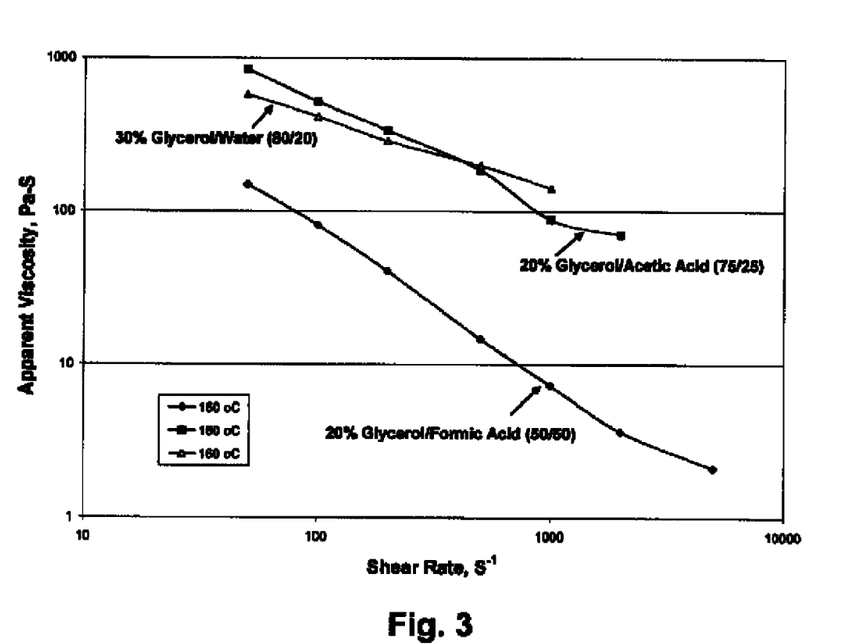
FIG. 3 is a graphical representation of the apparent melt viscosity (Pa-s) of the thermoplastic starches of Examples 5-6 versus shear rate (s$^{-1}$)

The viscosity of the thermoplastic starches of Examples 5-6 was also determined as described above. The results are set forth in FIG. 3. As indicated, chemical modification by acetic acid was not as effective in comparison to formic acid in reducing the viscosity of the thermoplastic starch.

Example 12

Figure 4:
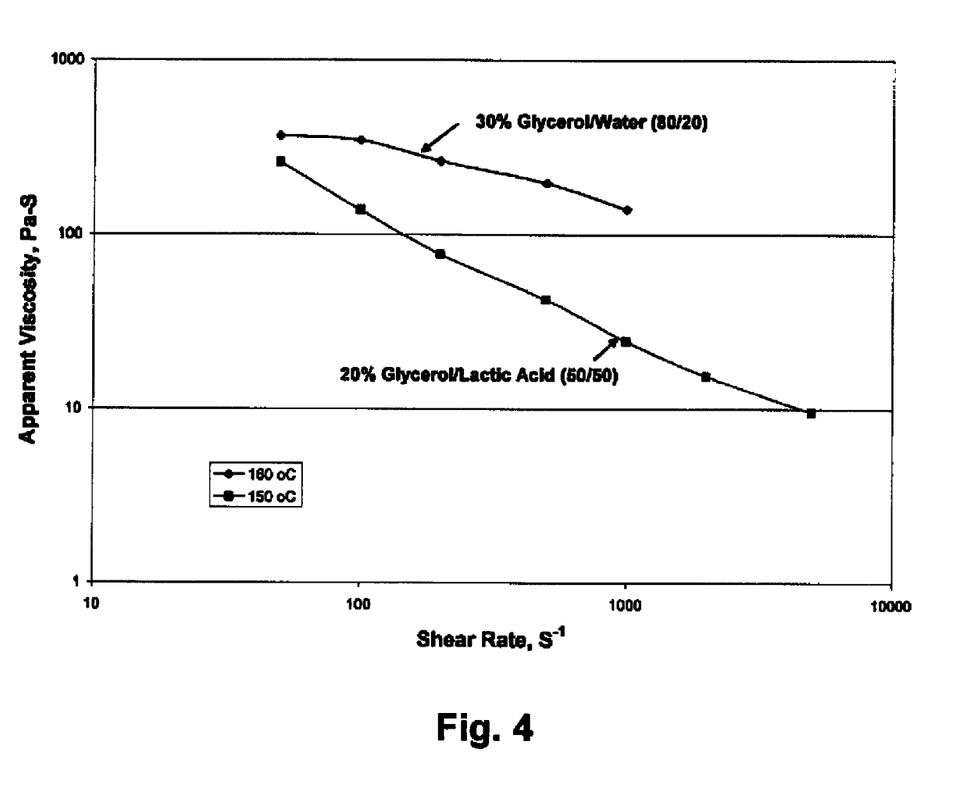
FIG. 4 is a graphical representation of the apparent melt viscosity (Pa-s) of the thermoplastic starches of Examples 7-8 versus shear rate (s$^{-1}$)

The viscosity of the thermoplastic starches of Examples 7-8 was also determined as described above. The results are set forth in FIG. 4. As indicated, the thermoplastic starch exhibited a significant viscosity reduction, indicating that apparent melt viscosity reduces further as the acidity of the organic acid increased.

Example 13

Various combinations of the thermoplastic starch of Examples 2, 3, 5, 6, and 8 were compounded in a Carver Press (Carver Press, Inc., Wabash, Ind.) and formed into pressed films. The set pressure was 15,000 lbs, pump speed was set at 100%, and the holding time was 5 seconds. The film thicknesses ranged from about 2 to about 3 mils (about 50.8 to about 76.2 micrometers). Once formed, the films were subjected to the above-described water disintegration test. The results are set forth below in Table 2.

TABLE 2

Pressed Films and Their Cold Water Dispersibility

| Sample No. | Time Needed to Disperse in Water |
| --- | --- |
| Example 2 | 1 minute |
| Example 3 | 4 minutes |
| Example 5 | 3 minutes |
| Example 6 | 3 minutes |
| Example 8 | 4 minutes |

Example 14

The ability to form a cast film with the thermoplastic starch of the present invention was demonstrated. The thermoplastic starch of Example 3 was dry blended in a HAAKE Rheomex 252 single screw extruder with an Ecoflex® F BX 7011 resin (BASF, Ludwigshafen, Germany) at weight percentages of 30 wt. % and 70 wt. %, respectively. The screw speed was set at 50 rpm and the temperature profile of the extruder from zone 1 to 5 was 140° C., 150° C., 150° C., 146° C., and 137° C., respectively. The melt temperature was 155° C. The resulting cast film was then conditioned at 25° C. and 50% relative humidity over a weekend. Thereafter, the mechanical properties of the film were tested as described above. The resulting film was determined to have a MD elongation of 688%, CD elongation of 447%, MD peak stress of 21 MPa, CD peak stress of 10 MPa, and MD Young's modulus of 146 MPa, and CD Young's modulus of 76 MPa.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A film comprising a thermoplastic starch formed from about 30 wt. % to about 95 wt. % of at least one starch, from about 1 wt. % to about 35 wt. % of at least one plasticizer, and from about 1 wt. % to about 35 wt. % of at least one weak organic acid, wherein the thermoplastic starch has a weight average molecular weight of from about 1,000,000 to about 5,000,000, polydispersity index of from about 0.5 to about 20, and apparent melt viscosity of from about 50 to about 800 Pascal-seconds, determined at a temperature of 150° C. and a shear rate of 100 sec$^{-1}$, and wherein the starch is melt blended with the plasticizer in the presence of the weak organic acid to form the thermoplastic starch.

2. The film of claim 1, wherein the starch is a native starch.

3. The film of claim 1, wherein the starch is a starch ester, starch ether, or a combination thereof.

4. The film of claim 1, wherein the starch has an amylose content of from about 10% to about 40% by weight.

5. The film of claim 1, wherein the starch includes corn starch, potato starch, or a combination thereof.

6. The film of claim 1, wherein the weak organic acid is a carboxylic acid.

7. The film of claim 1, wherein the weak organic acid has an acid dissociation constant of from 1 to about 5.

8. The film of claim 1, wherein the weak organic acid has an acid dissociation constant of from 2 to about 4.

9. The film of claim 1, wherein the plasticizer is a polyol.

10. The film of claim 1, wherein the thermoplastic starch is formed from about 50 wt. % to about 85 wt. % of at least one starch, from about 5 wt. % to about 25 wt. % of at least one plasticizer, and at least from about 5 wt. % to about 25 wt. % of at least one weak organic acid.

11. The film of claim 1, wherein the thermoplastic starch has a weight average molecular weight of from about 2,000,000 to about 3,500,000 grams per mole.

12. The film of claim 1, wherein the thermoplastic starch has a polydispersity index of from about 2 to about 10.

13. The film of claim 1, wherein the thermoplastic starch has an apparent melt viscosity of from about 200 to about 600 Pascal seconds, as determined at a temperature of 150° C. and a shear rate of 100 sec$^{-1}$.

14. The film of claim 1, wherein the film further comprises at least one biodegradable polyester.

15. The film of claim 1, wherein the film exhibits a dry ultimate tensile strength of from about 15 to about 50 Megapascals in the machine direction and a dry modulus of elasticity of from about 100 to about 500 Megapascals in the machine direction.

16. The film of claim 1, wherein the film exhibits a dry ultimate tensile strength of from about 5 to about 30 Megapascals in the cross-machine direction and a dry modulus of elasticity of from about 20 to about 150 Megapascals in the cross-machine direction.

17. The film of claim 1, wherein the film is water-sensitive.

18. The film of claim 1 and a release agent coated onto a surface thereof.

19. An absorbent article comprising the film of claim 1, wherein the absorbent article comprises a body portion that includes a liquid permeable topsheet, a generally liquid impermeable backsheet, and an absorbent core positioned between the backsheet and the topsheet.

20. The absorbent article of claim 19, wherein the backsheet includes the film.

21. A method for forming a film, the method comprising:
melt blending a composition comprising from about 30 wt. % to about 95 wt. % of at least one starch, from about 1 wt. % to about 35 wt. % of at least one plasticizer, and from about 1 wt. % to about 35 wt. % of at least one weak organic acid to form a thermoplastic starch, wherein the thermoplastic starch has a weight average molecular weight of from about 1,000,000 to about 5,000,000, polydispersity index of from about 0.5 to about 20, and apparent melt viscosity of from about 50 to about 800 Pascal-seconds, determined at a temperature of 150° C. and a shear rate of 100 sec$^{-1}$; and
extruding the thermoplastic starch onto a surface to form a film.

22. The method of claim 21, wherein the starch includes corn starch, potato starch, or a combination thereof.

23. The method of claim 21, wherein the weak organic acid is a carboxylic acid.

24. The method of claim 21, wherein the weak organic acid has an acid dissociation constant of from 2 to about 4.

25. The method of claim 21, wherein the plasticizer is a polyol.

26. The method of claim 21, wherein the composition comprises from about 50 wt. % to about 85 wt. % of at least one starch, from about 5 wt. % to about 25 wt. % of at least one plasticizer, and at least from about 5 wt. % to about 25 wt. % of at least one weak organic acid.

27. The method of claim 21, wherein the thermoplastic starch has a weight average molecular weight of from about 2,000,000 to about 3,500,000 grams per mole.

28. The method of claim 21, wherein the thermoplastic starch has a polydispersity index of from about 2 to about 10.

29. The method of claim 21, wherein the thermoplastic starch has an apparent melt viscosity of from about 200 to about 600 Pascal seconds, as determined at a temperature of 150° C. and a shear rate of 100 $sec^{-1}$.

30. The method of claim 21, wherein melt blending occurs at a temperature of from about 40° C. to about 160° C.

31. The method of claim 21, wherein melt blending occurs at a temperature of from about 60° C. to about 140° C.

32. The film of claim 1, wherein the weak organic acid includes acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, tartaric acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, pyrogallol, pyrocatechol, or a combination thereof.

33. The film of claim 1, wherein the film contains from about 60 wt. % to about 99 wt. % of the thermoplastic starch.

34. The film of claim 1, wherein the starch is a hydroxylalkyl starch.

35. The film of claim 34, wherein the hydroxyalkyl starch is hydroxyethyl starch, hydroxypropyl starch, hydroxybutyl starch, or a combination thereof.

36. The film of claim 1, wherein the thermoplastic starch further comprises a nonionic surfactant having an HLB value of from about 1 to about 20.

37. The method of claim 21, wherein the weak organic acid includes acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, tartaric acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, pyrogallol, pyrocatechol, or a combination thereof.

38. The method of claim 21, wherein the film contains from about 60 wt. % to about 99 wt. % of the thermoplastic starch.

39. The method of claim 21, wherein the starch is a hydroxylalkyl starch.

40. The method of claim 39, wherein the hydroxyalkyl starch is hydroxyethyl starch, hydroxypropyl starch, hydroxybutyl starch, or a combination thereof.

41. The film of claim 1, wherein the weight average molecular weight of the thermoplastic starch is less than the weight average molecular weight of the starch.

42. The film of claim 1, wherein the apparent melt viscosity of the thermoplastic starch is less than the apparent melt viscosity of the starch, as determined at a temperature of 150° C. and a shear rate of 100 $sec^{-1}$.

* * * * *